United States Patent
Staff et al.

(10) Patent No.: US 12,378,424 B2
(45) Date of Patent: Aug. 5, 2025

(54) MICROPARTICLE COMPOSITION COMPRISING AN ORGANIC IR ABSORBING PIGMENT

(71) Applicant: BASF SE, Ludwigshafen am Rhein (DE)

(72) Inventors: Roland Hinrich Staff, Ludwigshafen am Rhein (DE); Yannick Fuchs, Ludwigshafen am Rhein (DE); Helmut Reichelt, Ludwigshafen am Rhein (DE); Hans Reichert, Basel (CH); Oliver Seeger, Ludwigshafen am Rhein (DE); Korinna Dormann, Ludwigshafen am Rhein (DE); Bernd Dieter Oschmann, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 1118 days.

(21) Appl. No.: 17/286,473

(22) PCT Filed: Oct. 17, 2019

(86) PCT No.: PCT/EP2019/078222
§ 371 (c)(1),
(2) Date: Apr. 18, 2021

(87) PCT Pub. No.: WO2020/079154
PCT Pub. Date: Apr. 23, 2020

(65) Prior Publication Data
US 2021/0388223 A1    Dec. 16, 2021

(30) Foreign Application Priority Data

Oct. 18, 2018 (EP) .................... 18201244

(51) Int. Cl.
*C09D 11/00* (2014.01)
*B41M 3/14* (2006.01)
(Continued)

(52) U.S. Cl.
CPC ............. *C09D 11/037* (2013.01); *B41M 3/14* (2013.01); *B42D 25/382* (2014.10);
(Continued)

(58) Field of Classification Search
CPC ........ C09D 11/037; C09D 5/32; C09D 11/50; B24D 25/382; B41M 3/14; C09B 67/0013;
(Continued)

(56) References Cited

U.S. PATENT DOCUMENTS 4,918,317 A     4/1990   Hess et al.
2009/0308279 A1*  12/2009   Koganehira ......... B41M 5/0023
                                                524/386

FOREIGN PATENT DOCUMENTS

CA    3003349 A1    5/2017
CA    3004123 A1 *  5/2017  ........... B42D 25/378
(Continued)

OTHER PUBLICATIONS

International Preliminary Report on Patentability received for PCT Patent Application No. PCT/EP2019/078222, mailed on Mar. 16, 2021, 20 pages.
(Continued)

*Primary Examiner* — James E McDonough
(74) *Attorney, Agent, or Firm* — Faegre Drinker Biddle & Reath LLP

(57) ABSTRACT

The present invention relates to microparticle compositions comprising an organic IR absorbing pigment having a main absorption maximum in the range from 750 to 1100 nm. The invention also relates to a process for producing said
(Continued)

microparticle compositions and to their use in a printing ink, in particular in a printing ink, which is suitable for producing a security feature or a security document. The microparticles of the pigment composition contain the organic IR absorbing pigment as solid particles, which are surrounded by or embedded in an aminoplast polymer, which is a polycondensation product of one or more amino compounds and one or more aldehydes. The microparticle based pigment composition is characterized by a volume based particle size distribution, as determined by static light scattering according to ISO 13320:2009 EN, having a D(4,3) value in the range from 1.0 to 15.0 μm.

22 Claims, 1 Drawing Sheet

(51) Int. Cl.

| | | |
|---|---|---|
| B42D 25/382 | (2014.01) | |
| C09B 67/02 | (2006.01) | |
| C09B 67/08 | (2006.01) | |
| C09D 5/32 | (2006.01) | |
| C09D 11/037 | (2014.01) | |
| C09D 11/50 | (2014.01) | |
| D21H 19/42 | (2006.01) | |
| D21H 21/40 | (2006.01) | |
| D21H 21/48 | (2006.01) | |

(52) U.S. Cl.
CPC ...... *C09B 67/0013* (2013.01); *C09B 67/0097* (2013.01); *C09D 5/32* (2013.01); *C09D 11/50* (2013.01); *D21H 19/42* (2013.01); *D21H 21/40* (2013.01); *D21H 21/48* (2013.01)

(58) Field of Classification Search
CPC .... C09B 67/0097; D21H 19/42; D21H 21/48; D21H 21/40

USPC .................. 106/31.01, 31.13, 31.6
See application file for complete search history.

(56) References Cited

FOREIGN PATENT DOCUMENTS

| | | | |
|---|---|---|---|
| CA | 3004125 A1 | 5/2017 | |
| DE | 19833347 A1 | 1/2000 | |
| DE | 19835114 A1 | 2/2000 | |
| EP | 0026914 A1 | 4/1981 | |
| EP | 0218887 A2 | 4/1987 | |
| EP | 0319337 A1 | 6/1989 | |
| EP | 0383337 A2 | 8/1990 | |
| EP | 0415273 A2 | 3/1991 | |
| EP | 2682265 A1 * | 1/2014 | ............ B29C 65/16 |
| EP | 3067216 A1 | 9/2016 | |
| WO | 99/32220 A1 | 7/1999 | |
| WO | 01/51197 A1 | 7/2001 | |
| WO | 2006/074969 A1 | 7/2006 | |
| WO | 2008/086931 A1 | 7/2008 | |
| WO | 2012/069518 A1 | 5/2012 | |
| WO | 2017/080652 A1 | 5/2017 | |
| WO | 2017/080656 A1 | 5/2017 | |

OTHER PUBLICATIONS

International Search Report and Written Opinion received for PCT Patent Application No. PCT/EP2019/078222, mailed on Mar. 17, 2020, 18 pages.
Fabian et al., "Near-Infrared Absorbing Dyes", Chem. Rev., vol. 92, 1992, pp. 1197-1226.
Qian et al., "Near-Infrared Organic Compounds and Emerging Applications", Chem. Asian J., vol. 5, 2010, pp. 1006-1029.

* cited by examiner

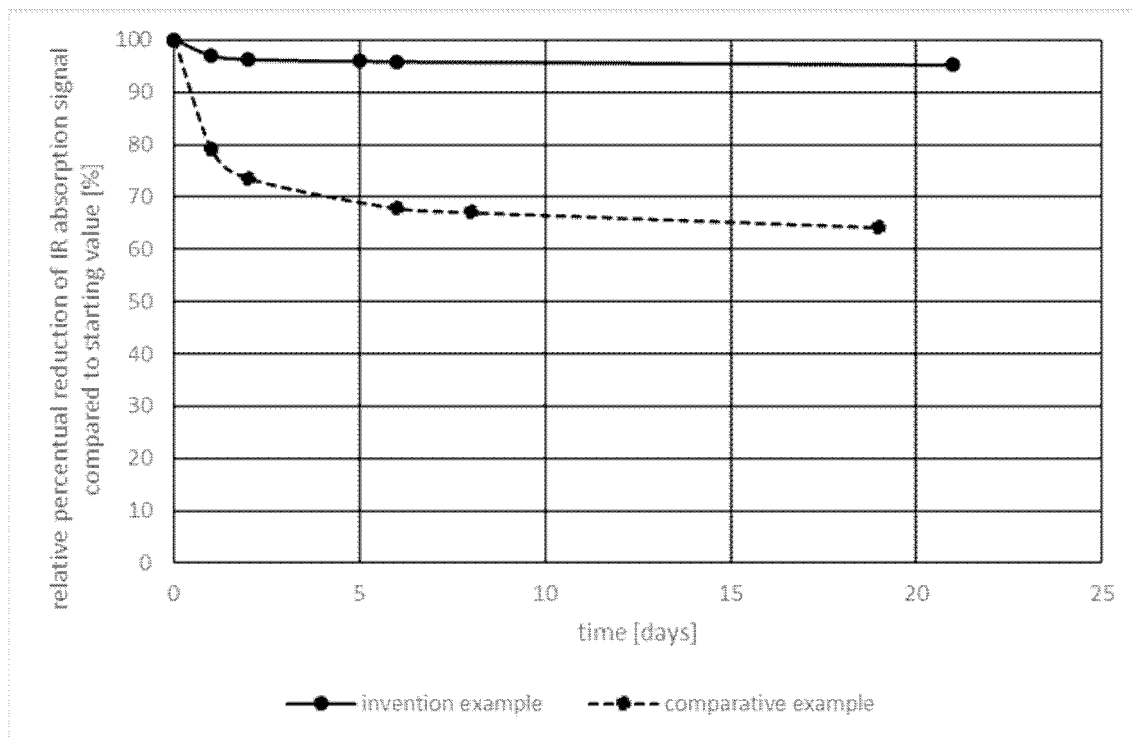

MICROPARTICLE COMPOSITION COMPRISING AN ORGANIC IR ABSORBING PIGMENT

CROSS-REFERENCE TO RELATED APPLICATIONS

This application is a national stage application (under 35 U.S.C. § 371) of PCT/EP2019/078222, filed Oct. 17, 2019, which claims benefit of European Application No. 18201244.3, filed Oct. 18, 2018, both of which are incorporated herein by reference in their entirety.

The present invention relates to microparticle compositions comprising an organic IR absorbing pigment having a main absorption maximum in the range from 750 to 1100 nm. The invention also relates to a process for producing said microparticle compositions and to their use in a printing ink, in particular in a printing ink, which is suitable for producing a security feature or a security document.

BACKGROUND OF THE INVENTION

Colorless or barely colored IR absorbers meet a significant technical need in a wide range of applications, such as security printing (bank notes, credit cards, identity cards, passports etc.), invisible and/or IR readable bar codes, the laser-welding of plastics, the curing of surface-coatings using IR radiators, the drying and curing of prints, the fixing of toners on paper or plastics, optical filters for PDPs (plasma display panels), laser marking e.g. of paper or plastics, the heating of plastics preforms or heat shielding applications.

A large number of organic and inorganic substances belonging to different compound classes and with a great variety of different structures are known for the application as IR absorbers (see e.g. EP30672216 and the reference cited therein). Notwithstanding that large numbers of known compound classes and structures, the provision of products with a complex profile of properties often presents difficulties. There is a continuing demand for IR absorbers that are "colorless", which means that they have the minimum possible inherent color, and that simultaneously meet the technical stability requirements, such as chemical stability, heat stability and/or light stability.

Unfortunately, chemical stability of IR absorbing pigments is often not satisfactory. In particular, IR absorbing pigments having a main absorption maximum in the range from 750 to 1100 and being colorless may be instable, in particular against oxidative stress. Consequently, there is still a need for high-end applications of IR absorbing compounds of improving their fastness properties against oxidation. This property is particularly important for applications in the field of security printing. It is of prime importance in security printing applications that the IR absorbing properties remain high after the drying/hardening step of the printing ink and that the IR spectrum remains essentially unchanged as compared to its initial form before the drying/hardening step. It is also essential that the security feature made of the printing ink undergoes no meaningful change of its absorption characteristic during the lifetime of the security document. Finally, it is essential that the IR-absorbing pigment contained in the printing ink does not degrade before the ink is actually used (shelf-life stability).

WO 2017/080652 describes security pigments in the form of core shell particles, which have a core made of a thermoplastic polymer and containing a UV, VIS or IR dye and a shell formed by a condensation polymer such as a melamine formaldehyde resin. The preparation includes the preparation of dye containing polymer particles, followed by incorporation of the thus obtained polymer particles in a duroplastic matrix, grinding the thus obtained matrix and encapsulation of the thus obtained dye containing polymer particles by the condensation polymer. The obtained core shell particles contain only small amounts of the dye. Moreover, this concept is applicable only to those dyes, which are soluble in the organic solvents and compatible with the thermoplastic polymer.

WO 2017/080656 describes security pigments in the form of core shell particles, which have a core made of a crosslinked, duroplastic addition polymer containing a UV, VIS or IR dye and a shell formed by an addition polymer such as a melamine formaldehyde resin. The preparation of these pigments is tedious. It requires the preparation of dye containing polymer particles by incorporating the dye in a duroplastic matrix, grinding the thus obtained matrix and encapsulation of the thus obtained dye containing polymer particles by the condensation polymer. The obtained core shall particles contain only small amounts of the dye. Moreover, this concept is applicable only to those dyes, which can be incorporated into the duroplastic polymer matrix.

EP30672216 describes pigment compositions containing an IR absorber and a stabilizing agent selected from thioamide, thioureas and thiocarbamate compounds, such as thrihiocyanuric acid, diphenylthiourea, dibutylthiourea, diisopropylthiourea, 2-mercapto-1-methylimidazole, 2-mercaptobenzimidazole, N-phenylthioacetamide, and their tautomers such as 2-thiomercaptopyrimidine compounds. While these compositions provide improved stability to IR absorbing pigments both to chemicals and light and do not impart color, low molecular stabilizing compounds may not always be acceptable and the long term stability may not always be satisfactory, as the stabilizers may themselves degrade.

Hence, there is a need for organic IR absorbing pigment compositions, which can be easily prepared from conventional IR-absorbing pigments, in particular organic IR absorbing pigments, which provide enhanced stability to the IR absorbing pigments, in particular enhanced stability against oxidative stress as occurring in oxidatively drying printing inks. Moreover, the pigment composition should be compatible with printing inks and capable of being easily incorporated in printing inks, in particular in oxidatively drying printing inks.

SUMMARY OF THE INVENTION

It was surprisingly found that the microparticle based pigment compositions of an organic IR absorbing pigment as described herein meet the technical stability requirements, in particular chemical stability, and can be easily incorporated into printing inks.

Therefore, the present invention relates to microparticle based pigment compositions of an organic IR absorbing pigment having a main absorption maximum in the range from 750 to 1100 nm, wherein the microparticles of the pigment composition contain the organic IR absorbing pigment as solid particles, which are surrounded by or embedded in an aminoplast polymer, which is a polycondensation product of one or more amino compounds and one or more aldehydes, where the microparticle based pigment compositions are characterized by a volume based particle size distribution, as determined by static light scattering according to ISO 13320:2009 EN, having a D(4,3) value in the range from 1.0 to 15.0 µm, in particular in the range from 3.0 to 12.0 µm.

The present invention also relates to a method for producing the microparticle based pigment composition of the invention, which comprises the following steps:
i) providing an aqueous suspension of the solid organic IR absorbing pigment which also contains an aminoplast pre-condensate of one or more amino compounds and one or more aldehydes;
ii) effecting the polycondensation of the aminoplast pre-condensate in the aqueous suspension of the solid organic IR absorbing pigment in the presence of at least one surfactant.

The invention also relates to the use of the inventive microparticle based pigment composition in a printing ink, in particular in an oxidatively drying printing ink, in particular in a printing ink, which is suitable for intaglio printing.

A further aspect of the invention relates to a printing ink, in particular a printing ink for security printing containing a microparticle based composition as described herein and a binder, in particular an oxidatively drying binder.

A further aspect of the invention relates to a method for producing a security feature or a security document, which comprises applying the printing ink of the invention to a substrate by a printing process.

The present invention is associated with several benefits. The microparticle based compositions of the invention provide enhanced stability to the IR absorbing pigments contained therein, in particular stability to chemicals and to light. In particular, the compositions provide enhanced stability to oxidative stress as occurring in oxidatively drying printing inks. Hence, the IR absorbing properties remain high after the drying/hardening step of the printing ink and that the IR spectrum remains essentially unchanged as compared to its initial form before the drying/hardening step. What is more, the compositions of the invention have good long-term stability and do not require the use of additional stabilizers. Furthermore, the compositions can be easily incorporated in printing inks. The process of the invention allows for incorporating high amounts of the IR absorbing organic pigment into the composition. Thus, it is possible to obtain compositions containing high amounts of the IR absorbing organic pigment and comparatively low amount of other ingredients, which might affect the IR absorbance of the pigment or other properties. Rather, the microparticle based compositions of the invention have an IR absorption profile that is essentially unaffected by their protective aminoplast shell, by comparison with the parent, untreated organic pigment.

DETAILED DESCRIPTION OF THE INVENTION

Here and throughout the specification, the term "microparticle based composition" relates to compositions of discrete microparticles. The term "microparticle" indicates that the discrete particles have usually a particle size which does not exceed a few micrometers or is even lower, e.g. in the nanometer range. In particular, the term "microparticle" indicates at least 90% by volume, based on the total volume of particles contained in the composition, of the particles have a particle size of less than 25 µm, in particular of at most 20.0 µm, more particularly of at most 17.5 µm and especially of at most 15.0 µm, given as D(v 0.9) value.

The particle size as referred herein, and also the particle size distribution, characterized by e.g. the D(v 0.1), D(v 0.5), D(v 0.9), D(3,2) and D(4,3) values, is the diameter of the particles, e.g. the pigment particles as well as the pigment-polymer particles, which can be determined by techniques such as laser diffraction, which is also called static light scattering (SLS). SLS is usually performed in accordance with ISO 13320:2009 EN.

In the context of particle size, the D(0.9) or D(v 0.9) value of particle size indicates that 90 vol.-% of the particles have a hydrodynamic diameter smaller than this value. In the context of particle size, the volume median particle diameter D(0.5) or D(v 0.5) value, respectively, means that 50 vol.-% of the particles have a diameter which is above the value cited and 50 vol.-% of the particles have a diameter which is below the value cited. In the context of particle size, the D(0.1) or D(v 0.1) value indicates that 10 volume % of the particles have a hydrodynamic diameter below the value cited. The D(3,2) describes the surface-weighted average mean of all particles, while the D(4,3) describes the volume-weighted average mean of all particles.

The microparticles contained in the microparticle based composition contain an organic IR-absorbing pigment and an aminoplast polymer. The organic IR-absorbing pigment is embedded in or surrounded by the aminoplast resin.

The aminoplast polymer contained in the microparticle composition of the present invention is a polycondensation product of one or more amino compounds and one or more aldehydes. Useful amino compounds in this respect are amines having at least two amino groups, in particular 2 or 3 amino groups. These amines are preferably characterized in that each of their amino groups is attached to a carbon atom which is linked via a double bond to an oxygen atom, sulfur atom or nitrogen atom. Preferred examples of such amines are urea, thiourea and melamine, cyanoguanamine (=dicyandiamide), acetoguanamine and benzoguanamine. Useful aldehydes in this respect are $C_1$-$C_{10}$-alkanals, especially $C_1$-$C_4$-alkanals, such as formaldehyde, acetaldehyde, propanal or n-butanal, and $C_2$-$C_{10}$-alkandials, especially $C_2$-$C_6$-alkandials, such as glyoxal or glutaraldehyde. Preferred aldehydes are formaldehyde, glyoxal and glutaraldehyde, in particular formaldehyde. The aminoplast polymer may be partially or wholly etherfied.

The aminoplast polymer of the inventive microparticle composition is typically selected from melamine-formaldehyde resins (=MF resins), including wholly or partially etherified MF resins, urea-formaldehyde resins (=UF resins), thiourea-formaldehyde resins (=TUF resins), melamine-urea-formaldehyde resins (=MUF resins), including wholly or partially etherified MUF resins, melamine-thiourea-formaldehyde resins (=MTUF resins), including partially etherified MTUF resins, urea-glutaraldehyde resins, benzoguanamine-formaldehyde resins, dicyandiamide-formaldehyde resins and urea-glyoxal resins, i.e. from polymers that are obtained by polycondensation of melamine, urea, thiourea, melamine/(thio)urea mixtures, benzoguanamine or dicyandiamide with formaldehyde, by polycondensation of urea with glutaraldehyde, or by polycondensation of urea with glyoxal.

The aminoplast polymer of the inventive microparticle composition is preferably selected from MF resins, including wholly or partially etherified MF resins and melamine-urea-formaldehyde resins (=MUF resins), including wholly or partially etherified MUF resins, in particular is a MF resin, and especially a wholly or partially etherified MF resins.

The amount of aminoplast polymer in the microparticle composition of the present invention usually is from 15 to 50% by weight, in particular from 17 to 45% by weight and especially from 19 to 42% by weight, based on the total weight of the aminoplast polymer and the organic IR absorbing pigment. Consequently, the amount of the IR-absorbing pigment in the microparticle composition of the present invention is usually from 50 to 85% by weight, in particular from 55 to 83% by weight and especially from 68 to 81% by weight, based on the total weight of the aminoplast polymer and the organic IR absorbing pigment.

In principle any IR absorbing organic compound known in the art, which has a main absorption maximum in the range from 750 to 1100 nm is suitable to be used as the organic IR absorbing pigment contained in the microparticle based composition of the invention. Preference is given to IR absorbing pigments which are "colourless", which means that they have a minimal absorption in the VIS range of the electromagnetic spectrum, in particular in the range from 400 to 700 nm.

Pigments in terms of the present invention are polyunsaturated polycyclic organic compounds or metal organic compounds, which have a main absorption maximum in the range from 750 to 1100 nm. Particular preference is given to polycyclic organic metal organic compounds, in particular to complexes of mono- or polyunsaturated mono- or polycyclic organic compounds with a metal or semi-metal, where the mono- or polyunsaturated mono- or polycyclic organic compound together with the metal atom or semi metal forms a polyunsaturated polycyclic metal organic compound. The pigments of the present invention mainly consist of polyunsaturated polycyclic organic compounds or metal organic compound. Organic pigments according to the present invention in particular contain less than 60% by weight, in particular less than 50% by weight or less than 40% by weight, or even less than 30% by weight, based on the total weight of the pigment, of organic matter having not a main absorption maximum in the range from 750 to 1100 nm.

Frequently, the organic IR absorbing pigment is selected from the group consisting of metal dithiolene complexes, phthalocyanine pigments, naphthalocyanine pigments, rylene pigments, polymethine pigments and anthraquinone pigments, in particular those described in detail in EP 3 067 216, which is incorporated herein by reference, as well as mixtures of these pigments.

More preferably the organic IR absorbing pigment of the inventive microparticle composition is selected from the naphthalocyanine pigments and metal dithiolene complexes. Suitable naphthalocyanine pigments are those of formulae IIIc, IIId and IIIe described in EP 3067216, which is incorporated herein by reference. Suitable metal dithiolene complexes are those described e.g. by formulae IIa and IIb in EP 3067216 and in particular those described by formula (I) of WO 2008/086931 or by formula (I) of WO 2012/069518, which are incorporated herein by reference.

In a particular embodiment of the present invention the organic IR absorbing pigment of the inventive microparticle composition is selected from the group consisting of the metal dithiolene complexes of the formula (I),

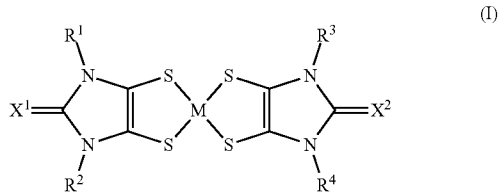

wherein
M is Ni, Pd or Pt,
$X^1$, $X^2$, independently of each other, are O or S,
$R^1$, $R^2$, $R^3$ and $R^4$, are identical or different and selected from the group consisting of alkyl, where 1 or more non-adjacent $CH_2$ radicals of alkyl may be replaced by O, alkenyl, aryl and hetaryl, where aryl and hetaryl are unsubstituted or substituted.

Here and throughout the specification, the term "alkyl" relates to a linear or branched, saturated hydrocarbon radical having usually 1 to 18 carbon atoms, in particular 1 to 12 carbon atoms, frequently, 1 to 6 carbon atoms, in particular 1 to 4 carbon atoms, such as methyl, ethyl, n-propyl, isopropyl, n-butyl, 2-butyl, isobutyl, tert-butyl, n-pentyl, 2-pentyl, 1,2-dimethylpropyl, 2,2-dimethylpropyl, n-hexyl, 2-hexyl, 2,3-dimethylbutyl, n-heptyl, 2-heptyl, n-octyl, 2-octyl, 2-ethylhexyl, 2,4,4-trimethylpentyl, n-nonyl, 2-nonyl, n-decyl, 2-decyl, n-undecyl, 2-undecyl, n-dodecyl, 2-dodecyl and 2,4,4,6,6-pentamethyldecyl.

Here and throughout the specification, the term "alkyl, where 1 or more non-adjacent $CH_2$ radicals of alkyl are replaced by O" relates to a linear or branched, saturated aliphatic radical having usually 3 to 18 carbon atoms, in particular 4 to 12 carbon atoms, where at least 1 of the $CH_2$ groups, e.g. 1, 2, 3 or 4 non-adjacent $CH_2$ groups are replaced by O, thus forming an oxyalkylene group, such as methoxymethyl, 2-methoxyethyl, 2-ethoxyethyl, 2-propoxyethyl, 2-methoxypropyl, 2-ethoxypropyl, 3-methoxypropyl, 3-ethoxypropyl, 2-(2-methoxyethoxy)-ethyl, 2-(2-ethoxyethoxy)-ethyl, 2-(2-methoxyethoxy)-propyl, 2-(2-ethoxyethoxy)-propyl, 2-(2-methoxypropoxy)-propyl, 2-(2-ethoxypropoxy)-propyl, 3-(2-methoxyethoxy)-propyl, 3-(2-ethoxyethoxy)-propyl, 2-(2-(2-methoxyethoxy)-ethoxy)ethyl, 2-(2-(2-ethoxyethoxy)-ethoxy)ethyl, 2-(2-(2-methoxyethoxy)-ethoxy)propyl, 2-(2-(2-ethoxyethoxy)-ethoxy)propyl, 3-(2-(2-methoxyethoxy)-ethoxy)propyl, 3-(2-(2-ethoxyethoxy)-ethoxy)propyl, etc.

Here and throughout the specification, the term "alkenyl" relates to a linear or branched, unsaturated hydrocarbon radical having usually 2 to 18 carbon atoms, in particular 3 to 12 carbon atoms, frequently, 3 to 6 carbon atoms and bearing at least one ethylenically unsaturated double bond, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl or 2-methyl-2-propenyl; $C_2$-$C_6$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like, or $C_2$-$C_5$-alkenyl, such as the radicals mentioned for $C_2$-$C_6$-alkenyl and additionally 1-heptenyl, 2-heptenyl, 3-heptenyl, 1-octenyl, 2-octenyl, 3-octenyl, 4-octenyl and the positional isomers thereof.

Here and throughout the specification, the term "aryl" refers to mono- and polycyclic aryl while the term "hetaryl" refers to mono- and polycyclic hetaryl, where the terms "monocyclic aryl", "polycyclic aryl", "monocyclic hetaryl" and "polycyclic aryl" are as defined herein.

Here and throughout the specification, the term "substituted" in the context of aryl and hetaryl means that aryl and hetaryl carry at least one radical different from hydrogen. In particular, the term "substituted" means that aryl and hetaryl are substituted with 1, 2, 3, 4 or 5 radicals $R^a$ as defined below.

Here and throughout the specification, the terms "monocyclic aromatic radical" and "monocyclic aryl" refer to phenyl.

Here and throughout the specification, the term "polycyclic aryl" refers to:

(i) a polycyclic aromatic hydrocarbon radical, i.e. a completely unsaturated polycyclic hydrocarbon radical, where each of the carbon atoms is part of a conjugate π-electron system, (ii) a polycyclic hydrocarbon radical bearing one phenyl ring which is fused to a saturated or unsaturated 4 to 10-membered mono- or bicyclic hydrocarbon ring, (iii) a polycyclic hydrocarbon radical which bears at least 2 phenyl rings which are fused to each other directly and/or which are fused to a saturated or unsaturated 4 to 10-membered mono- or bicyclic hydrocarbon ring.

Usually polycylic aryl has from 9 to 26, e.g. 9, 10, 12, 13, 14, 16, 17, 18, 19, 20, 22, 24, 25 or 26 carbon atoms, in particular from 10 to 20 carbon atoms, especially 10, 12, 13, 14 or 16 carbon atoms.

In this context, polycyclic aryl bearing 2, 3 or 4 phenyl rings which are directly fused to each other include e.g. naphthyl, anthracenyl, phenanthrenyl, pyrenyl and triphenylenyl. Polycyclic aryl bearing 2, 3 or 4 phenyl rings which are fused to a saturated or unsaturated 4- to 10-membered mono- or bicyclic hydrocarbon ring include e.g. 9H-fluorenyl, biphenylenyl, tetraphenylenyl, acenaphthenyl (1,2-dihydroacenaphthylenyl), acenaphthylenyl, 9,10-dihydroanthracen-1-yl, 1,2,3,4-tetrahydrophenanthrenyl, 5,6,7,8-tetrahydrophenanthrenyl, cyclopent[fg]acenaphthylenyl phenalenyl, fluoranthenyl, benzo[k]fluoranthenyl, perylenyl, 9,10-dihydro-9,10[1',2']-benzenoanthracenyl, dibenzo[a,e][8]annulenyl, 9,9'-spirobi[9H-fluoren]yl and spiro[1H-cyclobuta[de]naphthalene-1,9'-[9H]fluoren]yl.

Polycylic aryl includes, by way of example naphthyl, 9H-fluorenyl, phenanthryl, anthracenyl, pyrenyl, acenaphthenyl, acenaphthylenyl, 2,3-dihydro-1H-indenyl, 5,6,7,8-tetrahydro-naphthalenyl, cyclopent[fg]acenaphthylenyl, 2,3-dihydrophenalenyl, 9,10-dihydroanthracen-1-yl, 1,2,3,4-tetrahydrophenanthrenyl, 5,6,7,8-tetrahydrophenanthrenyl, fluoranthenyl, benzo[k]fluoranthenyl, biphenylenyl, triphenylenyl, tetraphenylenyl, 1,2-dihydroacenaphthylenyl, dibenzo[a,e][8]annulenyl, perylenyl, biphenylyl, terphenylyl, naphthylenphenyl, phenanthrylphenyl, anthracenylphenyl, pyrenylphenyl, 9H-fluorenylphenyl, di(naphthylen)phenyl, naphthylenbiphenyl, tri(phenyl)phenyl, tetra(phenyl)phenyl, pentaphenyl(phenyl), phenylnaphthyl, binaphthyl, phenanthrylnaphthyl, pyrenylnaphthyl, phenylanthracenyl, biphenylanthracenyl, naphthalenylanthracenyl, phenanthrylanthracenyl, dibenzo[a,e][8]annulenyl, 9,10-dihydro-9,10 [1',2']benzoanthracenyl, 9,9'-spirobi-9H-fluorenyl and spiro [1H-cyclobuta[de]naphthalene-1,9'-[9H]fluoren]yl.

Here and throughout the specification, the terms "monocyclic heteroaromatic radical" and "monocyclic hetaryl" refer to a heteroaromatic monocyclic radical, where the ring member atoms are part of a conjugate π-electron system, where the heteroaromatic monocycle has 5 or 6 ring atoms, which comprise as heterocyclic ring members 1, 2, 3 or 4 nitrogen atoms or 1 oxygen atom and 0, 1, 2 or 3 nitrogen atoms, or 1 sulphur atom and 0, 1, 2 or 3 nitrogen atoms, where the remainder of the ring atoms are carbon atoms. Examples include furyl (=furanyl), pyrrolyl (=1H-pyrrolyl), thienyl (=thiophenyl), imidazolyl (=1H-imidazolyl), pyrazolyl (=1H-pyrazolyl), 1,2,3-triazolyl, 1,2,4-triazolyl, tetrazolyl, oxazolyl, thiazolyl, isoxazolyl, isothiazolyl, 1,3,4-oxadiazolyl, 1,3,4-thiadiazolyl, pyridyl (=pyridinyl), pyrazinyl, pyridazinyl, pyrimidinyl and triazinyl.

Here and throughout the specification, the term "polycyclic hetaryl" refers to a heteroaromatic polycyclic radical, which bear a monocyclic hetaryl ring as defined above and at least one, e.g. 1, 2, 3, 4 or 5, further aromatic rings selected from phenyl and heteroaromatic monocycles as defined above, where the aromatic rings of polycyclic hetaryl are linked to each other by a covalent bond and/or fused to each other directly and/or fused to a saturated or unsaturated 4 to 10-membered mono- or bicyclic hydrocarbon ring. The term "polycyclic hetaryl" also refers to heteroaromatic polycyclic radicals, which bear at least one saturated or partially unsaturated 5- or 6-membered heterocyclic ring bearing 1 or 2 heteroatoms selected from oxygen, sulphur and nitrogen as ring atoms, such as 2H-pyran, 4H-pyran, thiopyran, 1,4-dihydropyridin, 4H-1,4-oxazin 4H-1,4-thiazin or 1,4-dioxin, and at least one, e.g. 1, 2, 3, 4 or 5, further aromatic rings selected from phenyl and heteroaromatic monocycles, where at least one of the further aromatic rings is directly fused to the saturated or partially unsaturated 5- or 6-membered heterocyclic radical and where the remainder of further aromatic rings of polycyclic hetaryl are linked to each other by a covalent bond or fused to each other directly and/or fused to a saturated or unsaturated 4 to 10-membered mono- or bicyclic hydrocarbon ring. Usually polycylic hetaryl has 9 to 26 ring atoms in particular 9 to 20 ring atoms, which comprise 1, 2, 3 or 4 atoms selected from nitrogen atoms, sulphur atoms and oxygen atoms, where the remainder of the ring atoms are carbon atoms.

Examples of polycyclic hetaryl include, but are not limited to, benzofuryl, benzothienyl, dibenzofuranyl (=dibenzo [b,d]furanyl), dibenzothienyl (=dibenzo[b,d]thienyl), naphthofuryl, naphthothienyl, furo[3,2-b]furanyl, furo[2,3-b]furanyl, furo[3,4-b]furanyl, thieno[3,2-b]thienyl, thieno[2,3-b]thienyl, thieno[3,4-b]thienyl, oxanthrenyl, thianthrenyl, indolyl (=1H-indolyl), isoindolyl (=2H-isoindolyl), carbazolyl, indolizinyl, benzopyrazolyl, benzimidazolyl, benzoxazolyl, benzothiazolyl, benzo[cd]indolyl, 1H-benzo[g]indolyl, quinolinyl, isoquinolinyl, acridinyl, phenazinyl, quinazolinyl, quinoxalinyl, phenoxazinyl, phenthiazinyl, benzo[b][1,5]naphthyridinyl, cinnolinyl, 1,5-naphthyridinyl, 1,8-naphthyridinyl, phenylpyrrolyl, naphthylpyrrolyl, dipyridyl, phenylpyridyl, naphthylpyridyl, pyrido[4,3-b]indolyl, pyrido[3,2-b]indolyl, pyrido[3,2-g]quinolinyl, pyrido[2,3-b][1,8]naphthyridinyl, pyrrolo[3,2-b]pyridinyl, pteridinyl, puryl, 9H-xanthenyl, 9H-thioxanthenyl, 2H-chromenyl, 2H-thiochromenyl, phenanthridinyl, phenanthrolinyl, furo[3,2-f][1]benzofuranyl, furo[2,3-f][1]benzofuranyl, furo[3,2-g]quinolinyl, furo[2,3-g]quinolinyl, furo[2,3-g]quinoxalinyl, benzo[g]chromenyl, thieno[3,2-f][1]benzothienyl, thieno[2,3-f][1]benzothienyl, thieno[3,2-g]quinolinyl, thieno[2,3-g]quinolinyl, thieno[2,3-g]quinoxalinyl, benzo[g]thiochromenyl, pyrrolo[3,2,1-hi]indolyl, benzo[g]quinoxalinyl, benzo[f]quinoxalinyl, and benzo[h]isoquinolinyl.

Here and throughout the specification, the term "cycloalkyl" relates to a mono- or polycyclic saturated hydrocarbon radical having usually 3 to 12 carbon atoms, frequently, 3 to 8 carbon atoms, in particular 5 to 6 carbon atoms, such as cyclopentyl, cyclohexyl, norbornyl or adamantyl.

The metal atom M in the dithiolene complex of formula (I) is preferably nickel or platinum and in particular is nickel.

The variables $X^1$ and $X^2$ in formula (I) may be different, but are preferably identical and are both either sulfur or oxygen. In a particular preferred embodiment $X^1$ and $X^2$ are both sulfur.

Preferably, the radicals $R^1$, $R^2$, $R^3$ and $R^4$, independently of one another, are selected from $C_1$-$C_8$ alkyl, phenyl, polycyclic aryl, such as especially naphthyl, mono- and polycyclic hetaryl, such as especially pyridyl, furyl, thienyl, imidazolyl or pyrazolyl, where phenyl, polycyclic aryl, mono- and polycyclic hetaryl may be unsubstituted or substituted with 1, 2, 3, 4 or 5 radicals $R^a$.

The radicals $R^a$, independently of one another, are usually selected from the group consisting of halogen, $C_1$-$C_8$-alkyl, $C_1$-$C_8$-haloalkyl, $C_1$-$C_8$-alkoxy, $C_1$-$C_8$-alkylthio, $C_3$-$C_8$-cycloalkyl, heterocycloalkyl, aryl, hetaryl, hydroxyl, mercapto, cyano, nitro, COOH, $SO_3H$ and $NE^1E^2$, where $E^1$ and $E^2$ are each independently hydrogen, $C_1$-$C_6$-alkyl, $C_3$-$C_8$-cycloalkyl, heterocycloalkyl, aryl or hetaryl. In particular the radicals $R^a$, independently of one another, are selected from the group consisting of fluorine, chlorine, bromine, cyano, nitro, $C_1$-$C_4$-alkyl, such as methyl, ethyl, n-propyl, iso-propyl, n-butyl, 2-butyl, isobutyl or tert-butyl, $C_1$-$C_4$-haloalkyl, such as fluoromethyl, difluoromethyl, trifluoromethyl, chloromethyl, dichloromethyl 2-fluroethyl, 2,2-difluroethyl or 2,2,2-trifluroethyl, $C_1$-$C_3$-alkoxy, such as methoxy, ethoxy, n-propoxy or iso-propoxy, $C_3$-$C_6$-cycloalkyl, such as cyclopropyl, cyclobutyl, cyclopentyl or cyclohexyl, aryl, such as phenyl or naphthyl, and hetaryl, such as pyridyl, furyl, pyrrolyl, imidazolyl, pyrazolyl or thienyl, in particular selected from fluorine, chlorine, cyano, nitro, methyl, ethyl, n-propyl, iso-propyl, fluoromethyl, difluoromethyl, trifluoromethyl, chloromethyl, 2,2,2-trifluroethyl, methoxy, ethoxy, phenyl, pyridyl, furyl and thienyl, more particularly selected from methyl, ethyl, isopropyl, fluorine, cyano, nitro, trifluoromethyl, 2,2,2-trifluroethyl, methoxy and phenyl, and specifically from methyl, ethyl, isopropyl, fluorine and trifluoromethyl.

In particular, the radicals $R^1$, $R^2$, $R^3$ and $R^4$, independently of one another, $C_1$-$C_e$ alkyl or aryl, where aryl is either substituted with one or two radicals $R^a$, which have the meanings defined herein, in particular the preferred ones, or is unsubstituted, i.e. it does not carry any radicals $R^a$. In case the radicals $R^1$, $R^2$, $R^3$ and/or $R^4$ are substituted with two radicals $R^a$, these two radicals $R^a$ are preferably identical.

Particularly preferred radicals $R^1$, $R^2$, $R^3$ and $R^4$ are, independently of one another, selected from methyl, ethyl, n-propyl, isopropyl, n-butyl, 2-butyl, isobutyl, n-hexyl, n-octyl, 2-ethylhexan-1-yl, phenyl, 2-methylphenyl, 3-methylphenyl, 4-methylphenyl, 2-ethylphenyl, 3-ethylphenyl, 4-ethylphenyl, 2-isopropylphenyl, 3-isopropylphenyl, 4-isopropylphenyl, 3,5-dimethylphenyl, 3,5-diethylphenyl, 3,5-diisopropylphenyl, 2,6-dimethylphenyl, 2,6-diethylphenyl, 2,6-diisopropylphenyl, 2-fluorophenyl, 3-fluorophenyl, 4-fluorophenyl, 2-chlorophenyl, 3-chlorophenyl, 4-chlorophenyl, pentafluorophenyl, 3,5-difluorophenyl, 2,6-difluorophenyl, 2-difluoromethyl-phenyl, 3-difluoromethyl-phenyl, 4-difluoromethyl-phenyl, 2-trifluoromethyl-phenyl, 3-trifluoromethyl-phenyl, 4-trifluoromethyl-phenyl, 3,5-di-trifluoromethyl-phenyl, 2-6-di-trifluoromethyl-phenyl, naphth-1-yl, naphth-2-yl, pyridin-2-yl, pyridin-3-yl, pyridin-4-yl, furan-2-yl, furan-3-yl, thien-2-yl and thien-3-yl.

Particular preference is given to metal dithiolene complexes of the formula (I), where the radicals $R^1$, $R^2$, $R^3$ and $R^4$ have all the same meaning which is selected from the meanings defined herein, in particular the preferred ones.

In another particular embodiment of the present invention the organic IR absorbing pigment contained in the microparticle based composition of the present invention is selected from the group consisting of the naphthaloycyanine complexes of the formula (II),

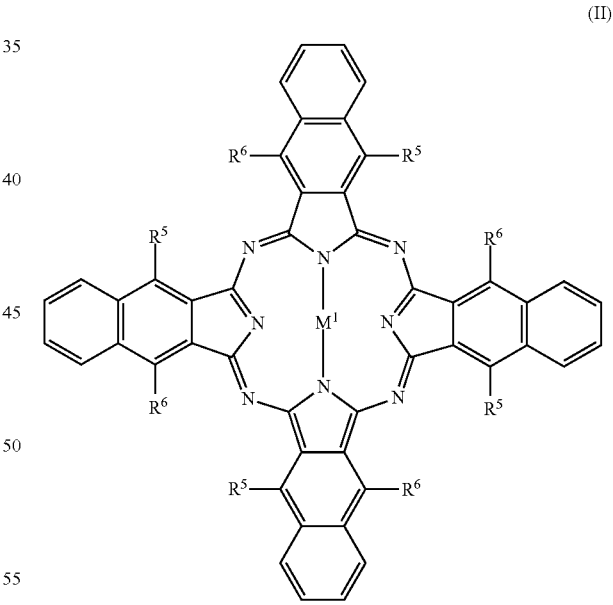

(II)

where
$M^1$ is Cu, Fe, Mn, Pd, Pt, VO, Si(OR$^8$)$_2$, Al(R$^7$) or Ga(R$^7$),
$R^5$ H, F, OR$^9$, SR$^9$, NHR$^{10}$, NR$^1$OR$^{11}$,
$R^6$ H, F, OR$^9$, SR$^9$, NHR$^{10}$, NR$^1$OR$^{11}$,
$R^7$ is selected from the group consisting of Cl, OH and OR$^{12}$;
$R^8$ is selected from the group consisting of $C_1$-$C_{12}$-alkyl, $(C_2H_4O)_m$—R$^{13}$ and phenyl;
$R^9$ is selected from the group consisting of $C_1$-$C_{12}$-alkyl, $(C_2H_4O)_m$—R$^{13}$ and phenyl;

$R^{10}$, $R^{11}$ independently of each other are selected from the group consisting of $C_1$-$C_{12}$-alkyl, $(C_2H_4O)_n$—$R^{13}$ and phenyl or $R^{10}$, $R^{11}$ together form a 5- or 6-membered saturated N-heterocyclic ring, which is optionally substituted by 1 or 2 methyl groups;

$R^{12}$ is selected from the group consisting of $C_1$-$C_{12}$-alkyl, $(C_2H_4O)_n$—$R^{13}$ and phenyl;

$R^{13}$ is $C_1$-$C_{12}$-alkyl, and n, m independently of each other are 0, 1, 2, 3 or 4.

The moiety $M^1$ in the naphthaloycyanine complex of formula (II) is preferably selected from the group consisting of Cu, Ga, Fe, Mn, Pd and Pt, in particular from Cu, Ga and Fe.

Preferably, the radicals $R^5$ and $R^6$ in formula (II), independently of one another, are selected the group consisting of H, F, $OR^9$ and $NHR^{10}$, in particular from H, F and $OR^9$.

According to a preferred embodiment of the invention the radicals $R^5$ and $R^6$ have the same meaning.

The radicals $R^7$, $R^8$, $R^9$, $R^{10}$. $R^{10}$. $R^{10}$. $R^{10}$, n and m have the following preferred meanings:

$R^7$ is OH or $OR^{12}$, in particular $OR^{12}$;

$R^8$ is $C_1$-$C_8$-alkyl or $(C_2H_4O)m$-$R^{13}$, in particular $C_1$-$C_6$-alkyl;

$R^9$ is $C_1$-$C_8$-alkyl or $(C_2H_4O)_m$—$R^{13}$, in particular $(C_2H_4O)_m$—$R^{13}$;

$R^{10}$ and $R^{11}$, independently of each other, are $C_1$-$C_8$-alkyl or $(C_2H_4O)_n$—$R^{13}$, more preferably $C_1$-$C_6$-alkyl or $(C_2H_4O)_n$—$R^{13}$ with n and $R^{13}$ having the preferred meanings defined herein, or $R^{10}$ and $R^{11}$ together form a 5- or 6-membered saturated N-heterocyclic ring;

$R^{12}$ is $C_1$-$C_8$-alkyl or $(C_2H_4O)_n$—$R^{13}$;

$R^{13}$ is $C_1$-$C_8$-alkyl, in particular $C_1$-$C_6$-alkyl;

n and m, independently of each other, are 1, 2 or 3, in particular 2 or 3.

In the microparticle composition of the present invention the volume-weighted average particle diameter D(4.3) of the microparticles is frequently in the range from 2.0 to 14.0 µm, in particular in the range from 3.0 to 12.0 µm, preferably in the range from 3.5 to 11.0 µm, more preferably in the range from 4.0 to 10.0 µm and especially in the range from 4.5 to 9.5 µm as determined by static light scattering.

In the microparticle composition of the present invention the D(v 0.5) of the microparticles is frequently in the range from 1.8 to 12.5 µm, in particular in the range from 2.8 to 11.0 µm, preferably in the range from 3.0 to 9.5 µm, more particularly in the range from 3.2 to 9.2 µm and especially in the range from 3.5 to 9.0 µm as determined by static light scattering.

In the microparticle composition of the present invention the surface-weighted average mean diameter D(3,2) of the microparticles is frequently in the range from 1.6 to 12.5 µm, in particular in the range from 2.6 to 10.5 µm, preferably in the range from 2.8 to 9.2 µm, more particularly in the range from 3.0 to 9.0 µm and especially in the range from 3.2 to 8.8 µm as determined by static light scattering.

In the microparticle composition of the invention the particle diameter D(v 0.1) of the microparticles is frequently at least 1.0 µm, in particular at least 2.0 µm, more particularly at least 2.4 µm and especially at least 2.7 µm, e.g. in the range from 1.0 to 8.0 µm, in particular in the range from 2.0 to 7.0 µm, more particularly in the range from 2.4 to 6.0 µm, and especially in the range from 2.7 to 5.5 µm, as determined by static light scattering.

In the microparticle composition of the invention the particle diameter D(v 0.9) of the microparticles is frequently at most 20.0 µm, in particular at most 17.5 µm and especially at most 15.0 µm, e.g. in the range from 4.0 to 20.0 µm, in particular from 5.0 to 17.5 µm, more particularly in the range from 6.0 to 15.0 µm, as determined by static light scattering.

Frequently, the microparticle based compositions of the present invention contain at least one dispersant, which may serve for stabilizing the pigment particles against agglomeration during the production of the microparticle based compositions of the present invention but may also beneficially affect the properties of the microparticle based compositions of the present invention, in particular with regard to their incorporation in printing inks.

Suitable dispersants are known to a skilled person. A general survey on the different types of polymeric dispersants, their polymeric architecture and their properties is given by F. Pirrung and C. Auschra in Macromolecular Engineering, Precise Synthesis, Materials Properties, Applications (ed. K. Matyjaszewski et al.), chapter 4, Polymeric Dispersants, pp. 2135-2180. Suitable polymeric dispersants for the purpose of the invention are principally organic polymers, which are soluble or at least dispersible in water, and which have at least one polar group which provides the water-solubility or dispersibility of the polymer and frequently at least one anchoring group, which is capable of being adsorbed onto the surface of the pigment particle. Anchoring may be achieved through hydrogen bonding, dipole-dipole interactions, pi-pi interaction and London- or Van der Waals forces and combination of these.

Preferably, the microparticle based compositions of the present invention contain at least one dispersant selected having one or more poly(oxy-$C_2$-$C_4$-alkylene) groups. The polyoxyalkylene group impart water-solubility or dispersibility to the polymeric dispersant and serve for steric stabilization of the pigment particles against agglomeration in the aqueous phase. The molecular weight of the polyoxyalkylene groups may vary from 200 to 5000 g/mol (number average) which corresponds to a range from 3 to 110 oxyalkylene repeating units.

Here and throughout the specification, the terms "polyoxyalkylene group", "polalkyleneoxide group" and polyalkylene glycol group are used synonymously and relate to oligomeric or polymeric groups or moieties, which are made of alkyleneoxy repeating units, in particular from $C_2$-$C_4$-alkyleneoxide repeating units, i.e. repeating units of the formula A-O, where A is $C_2$-$C_4$-alkandiyl, such as 1,2-ethandiyl, 1,2-propandiyl, 1,2-butandiyl, 2,3-butandiyl or 1-methyl-1,2-propandiyl, and especially from ethyleneoxy ($CH_2CH_2O$) and/or propyleneoxy ($CH(CH_3)CH_2O$) repeating units. Polyoxyalkylene groups made of $C_2$-$C_4$-alkyleneoxide repeating units are hereinafter termed poly(oxy-$C_2$-$C_4$-alkylene) groups or poly-$C_2$-$C_4$-alkylene glycol groups, respectively. Polyoxyalkylene groups made of ethylene oxide and/or propylene oxide repeating units are hereinafter termed poly(oxy-$C_2$-$C_3$-alkylene) groups or poly-$C_2$-$C_3$-alkylene glycol groups, respectively. The polyoxyalkylene groups may be non-capped, e.g. it has a terminal OH group or it may be capped, which means that it bears a terminal O-bound hydrocarbon radical, such as $C_1$-$C_{12}$-alkyl, $C_3$-$C_{12}$-alkyl or benzyl.

Suitable anchoring groups in dispersants are in particular aromatic or partially unsaturated heterocyclic radicals, such as pyridinyl, pyrimidinyl, triazinyl, pyrazolyl, imidazolyl, imidazolinyl or triazolyl radicals, optionally substituted with 1, 2 or 3 radicals selected from $C_1$-$C_{22}$-alkyl, $C_2$-$C_{20}$-alkenyl, OH, amino ($NH_2$), aminosulfonyl ($SO_2NH_2$) and carbamoyl ($CONH_2$);

aryl radicals, such as phenyl or naphthyl, where aryl bears at least one, e.g. 1, 2 or 3 radical, which is selected from OH, amino ($NH_2$), aminosulfonyl ($SO_2NH_2$) and carbamoyl ($CONH_2$), and optionally 1, 2 or 3 radicals, which are selected from $C_1$-$C_4$-alkyl;

long chain fatty acid radicals having frequently 8 to 22 carbon atoms, such as $C_8$-$C_{22}$-alkyl, $C_8$-$C_{22}$-alkenyl or $C_8$-$C_{22}$-alkadienyl;

lactamyl groups, such as pyrrolidone, caprolacton or morpholinone groups; and urethane or urea groups, including imidazolinone groups and triazintrione groups.

In particular, the microparticle based compositions of the present invention contain at least one dispersant selected from the group consisting of nonionic or anionic polymeric dispersants having a plurality of poly(oxy-$C_2$-$C_4$-alkylene) groups (dispersant type 1), acidic polyetheresters bearing at least one poly(oxy-$C_2$-$C_4$-alkylene) group, or mixtures thereof with poly(oxy-$C_2$-$C_4$-alkylene) glycols and/or anionic surfactants, (dispersant type II), and mixtures of a polyalkyleneimine modified with a fatty acid and at least one anionic surfactant bearing at least one poly(oxy-$C_2$-$C_4$-alkylene) group (dispersant type Ill).

Examples of dispersant type I include non-ionic or anionic polymers having a polyurethane backbone, where the polyoxyalkylene groups form part of the backbone or side chains, and non-ionic or anionic polymers having a carbon-backbone, where the polyoxyalkylene groups are present as side chains.

A particular group type I dispersants are selected from non-ionic comb polymers and anionic comb polymers having a carbon-backbone, where the polyoxyalkylene groups are present as side chains and mixtures thereof.

In particular, the type I polymeric dispersant is selected from comb polymers having both repeating units bearing poly-$C_2$-$C_4$-alkylene ether groups and repeating units from monomers having an anchoring group and mixtures thereof with comb polymers having both repeating units bearing poly-$C_2$-$C_4$-alkylene ether groups and repeating units from acidic monomers. These comb polymers are frequently made of polymerized repeating units of ethylenically unsaturated monomers M comprising in polymerized form at least one monoethylenically unsaturated monomer having an anchoring group (monomer M1) or an acidic group (M1'), a monoethylenically unsaturated monomer bearing a poly(oxyalkylene) group, in particular a poly(oxy-$C_2$-$C_4$-alkylene) group and especially a poly(oxy-$C_2$-$C_3$-alkylene) group (monomer M2) and optionally a non-ionic monomer M3 different therefrom. It is apparent to a skilled person that these types of polymers can be made by polymerizing monomers M1, M2 and optionally M3, e.g. by radical polymerization, or by subjecting a polymer made of polymers M1 and M3 to a polymer analogue reaction with OH terminated poly(oxy-$C_2$-$C_4$-alkylene) ether, in particular monofunctional OH terminated poly(oxy-$C_2$-$C_4$-alkylene) ethers, especially a monofunctional OH terminated poly (oxy-$C_2$-$C_3$-alkylene) ether, provided that the monomers M3 have a functional group, which is capable of undergoing an esterification or trans-esterification reaction, e.g. a carboxyl group or a $C_1$-$C_6$-alkoxycarbonyl group.

Suitable monomers M1 are

N-vinyl lactams, such as N-vinyl pyrrolidone, N-vinylcaprolactam and N-vinyl;

vinyl or ally substituted heterocycles, such as vinylpyridines, N-vinyl imidazole, N-vinyltriazole and N-vinylpyrazole;

with particular preference given to vinylpyridines.

Suitable monomers M1' are monoethylenically unsaturated carboxylic acids, in particular monoethylenically unsaturated monocarboxylic acids having 3 to 6 carbon atoms, such as acrylic acid or methacrylic acid, and monoethylenically unsaturated dicarboxylic acids having 4 to 6 carbon atoms, such as maleic acid or itaconic acid.

Suitable monomers M2 are e.g.

vinyl and ally ethers of poly(oxy-$C_2$-$C_4$-alkylene) ethers, which are also termed poly-$C_2$-$C_4$-alkylene glycols and especially of poly-$C_2$-$C_3$-alkylene glycols;

esters of acrylic acid with poly(oxy-$C_2$-$C_4$-alkylene) ethers, in particular with poly(oxy-$C_2$-$C_4$-alkylene) ethers and especially with poly(oxy-$C_2$-$C_3$-alkylene) ethers and esters of methacrylic acid with poly(oxy-$C_2$-$C_4$-alkylene) ethers, in particular with poly(oxy-$C_2$-$C_3$-alkylene) ethers, which are hereinafter also termed poly-$C_2$-$C_4$-alkylene glycol (meth)acrylate and poly-$C_2$-$C_3$-alkylene glycol (meth)acrylate, respectively;

diesters of maleic acid or of fumaric acid with poly(oxy-$C_2$-$C_4$-alkylene) ethers and especially with poly(oxy-$C_2$-$C_3$-alkylene) ethers.

In the aforementioned monomers M2, the poly(oxy-$C_2$-$C_4$-alkylene) group may be non-capped, i.e. terminated by a hydroxy group or capped, i.e. terminated by an O bound hydrocarbon radical, e.g. $C_1$-$C_6$ alkyloxy group. For example, the poly(oxyalkylene) group is a $C_1$-$C_6$ alkyl terminated polyoxyethylene group or $C_1$-$C_6$ alkyl terminated polyethylene glycol group, respectively methyl terminated polyoxyethylene group or methyl terminated polyethylene glycol group, respectively.

The molecular weight of the poly(oxy-$C_2$-$C_4$-alkylene) glycol group in type I dispersants may vary from 200 to 5000 g/mol, corresponding to 3 to 110 oxyalkylene repeating units.

Amongst the aforementioned monomers M2, preference is given to esters of acrylic acid with poly(oxy-$C_2$-$C_4$-alkylene) ethers, in particular with poly(oxy-$C_2$-$C_3$-alkylene) ethers and esters of methacrylic acid with poly (oxyalkylene) ethers, in particular with poly(oxy-$C_2$-$C_3$-alkylene) ethers. Particular preference is given to poly-$C_1$-$C_e$ alkyl terminated $C_2$-$C_4$-alkylene glycol (meth)acrylates, in particular to $C_1$-$C_6$ alkyl terminated poly-$C_2$-$C_3$-alkylene glycol (meth)acrylates and more particularly to $C_1$-$C_6$ alkyl terminated polyethylene glycol (meth)acrylates, especially to the corresponding methyl terminated polyalkylene glycol (meth)acrylates.

Suitable monomers M3 are e.g.

$C_1$-$C_8$-alkyl vinyl ethers and $C_1$-$C_8$-alkyl allyl ethers;

vinyl esters and allyl esters of $C_1$-$C_e$ alkanoic acids, such as vinyl acetate or vinyl propionate;

esters of acrylic acid and esters of methacrylic acid with $C_1$-$C_{12}$-alkanols, esters of acrylic acid and esters of methacrylic acid with $C_5$-$C_{12}$-cycloalkanols, in particular esters of acrylic acid and esters of methacrylic acid with $C_1$-$C_6$-alkanols, such as methyl acrylate, ethyl acrylate, n-propyl acrylate, n-butyl acrylate, isobutyl acrylate, tert-butyl acrylate, methyl methacrylate, ethyl methacrylate, n-propyl methacrylate, n-butyl methacrylate, isobutyl methacrylate, tert-butyl methacrylate;

vinylaromatic hydrocarbons such as styrene and vinyl toluene;

diesters of maleic acid with $C_1$-$C_{12}$-alkanols, such as dibutyl maleate and dibutyl fumarate.

Amongst the aforementioned monomers M3, preference is given to esters of acrylic acid with $C_1$-$C_{12}$-alkanols and esters of acrylic acid with $C_1$-$C_{12}$-alkanols, hereinafter referred to as $C_1$-$C_{12}$-alkyl (meth)acrylates. Particular preference is given to esters of acrylic acid with $C_1$-$C_6$-alkanols and esters of acrylic acid with $C_1$-$C_6$-alkanols, hereinafter referred to as $C_1$-$C_6$-alkyl (meth)acrylates.

In particular, the dispersant of type I comprises a nonionic comb polymer having a carbon, where the carbon backbone has both repeating units bearing a poly(oxy-$C_2$-$C_4$-alkylene) group and repeating units derived from vinyl pyridine units or a mixture thereof with a comb polymer, where the carbon backbone has both repeating units bearing a poly(oxy-$C_2$-$C_4$-alkylene) group and repeating units derived from one or more monomers M1'.

The dispersants of type II comprise at least one anionic polyetherester having one or more poly(oxy-$C_2$-$C_4$-alkylene) groups, which is in particular a polyetherester of a poly(oxy-$C_2$-$C_4$-alkylene) glycol, in particular a polyethylene glycol, with an aromatic dicarboxylic ester such as phthalic acid or terephthalic acid, and a diol component, which bears at least one carboxylic acid group. The anionic polyester may contain units of fatty acids, in particular long chain fatty acids having from 6 to 22 carbon atoms.

The molecular weight of the poly(oxy-$C_2$-$C_4$-alkylene) glycol groups in the anionic polyesters of type II dispersants may in particular vary from 200 to 5000 g/mol, corresponding to 3 to 110 oxyalkylene repeating units. The molecular weight of the polyetherester of type II dispersants may in particular vary from 500 to 20000 g/ as determined by GPC.

The dispersants of type II may further comprise one or more poly(oxy-$C_2$-$C_4$-alkylene) glycols, in particular polyethylene glycol or a poly(ethylene-co-propylene) glycol, and or an anionic surfactant, in particular an anionic surfactant bearing a sulfonate group or sulfate group. Examples of anionic surfactants include the salts of alkylbenzene sulfonates, the salts of alkyl sulfates, and the salts of the semiesters of sulfuric acid with $C_2$-$C_4$-alkoxylated fatty alcohols, in particular with ethoxylated or ethoxylated-co-propoxylated fatty alcohols, in particular the alkalimetal salts and the ammonium salts.

The dispersants of type Ill comprise at least one oligo- or polyalkyleneimine, in particular at least one oligo- or poly-$C_2$-$C_4$-alkyleneimine, which is modified with a fatty acid, in particular a modified oligo- or polyalkyleneimine based on a oligo- or polyalkyleneimine of the formula $NH_2$-A-NH-(A-NH)$_k$-A-$NH_2$, where A is $C_2$-$C_3$-alkylene and k is an integer from 0 to 50, in particular form 1 to 20. Suitable fatty acids for modifying the oligo- or polyalkyleneimine include $C_8$-$C_{22}$-alkanoic acids, $C_8$-$C_{22}$-alkenoic acids and $C_8$-$C_{22}$-alkadienoic acids and mixtures thereof.

Preferred modified oligo- or polyalkyleneimines preferably comprise at least 50% by weight, based on the total amount of modified oligo- or poly-$C_2$-$C_4$-alkyleneimine, of compounds which can be described by the following formulae IIIa, IIIb, IIIc, IIId and IIIe:

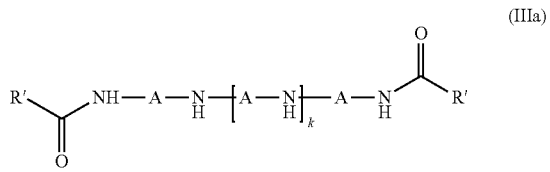

(IIIa)

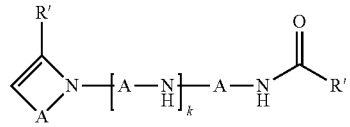

(IIIb)

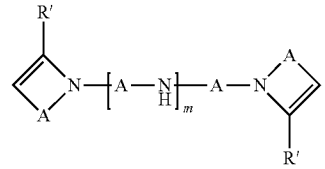

(IIIc)

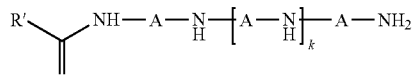

(IIId)

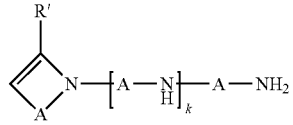

(IIIe)

where
R' are identical or different and selected from the group consisting of hydrocarbon radicals derived from a long chain fatty acid and where R' is in particular selected from the group consisting of $C_7$-$C_{21}$-alkyl, $C_7$-$C_{21}$-alkenyl and $C_7$-$C_{21}$-alkadienyl;
A $C_2$-$C_3$-alkylene, in particular 1,2-ethandiyl;
k is 0 to 50, in particular 1 to 20, m is k–1, i.e. 0 to 49 and in particular 0 to 19.

A skilled person will readily appreciate that the modified oligo- or polyalkyleneimines may also comprise compounds, where the further imino nitrogen atoms of the polyalkylene imine are modified by a fatty acid radical or an imidazoline radical as described for formulae (IIIb), (IIIe) and (IIIe). Particular preferred modified oligo- or polyalkyleneimines comprise at least one compound formula (IIIc) or a mixture thereof with one or more compounds of formulae (IIIa) or (IIIb), in particular mixture, where the compounds of formulae (IIIb) and (IIIc) amount to at least 30% by weight, based on the total weight of the modified oligo- or polyalkyleneimines present in the dispersant.

The dispersants of type Ill further comprises one or more anionic surfactants bearing at least one poly(oxy-$C_2$-$C_4$-alkylene) group. Examples of such anionic surfactants include the salts, in particular the alkalimetal salts and the ammonium salts, of the semiesters of sulfuric acid with $C_2$-$C_4$-alkoxylated fatty alcohols, in particular with ethoxylated or ethoxylated-co-propoxylated fatty alcohols and semiesters of an aliphatic dicarboxylic acid, such as maleic acid, furmaric acid or succinic acid with a $C_2$-$C_4$-alkoxylated fatty alcohol, in particular with ethoxylated or ethoxylated-co-propoxylated fatty alcohol.

If present in the microparticle based composition, the amount of dispersants is typically such that the weight ratio of the dispersant, calculated as solids, to the solid organic IR absorbing pigment is in the range from 0.05:1 to 1:1, preferably in the range from 0.1:1 to 0.8:1, in particular from 0.1:1 to 0.5:1.

According to one particular embodiment of the present invention the microparticle based compositions are in the form of aqueous suspension. Such a suspension contains the microparticles as a disperse phase, and an aqueous medium as the continuous phase. The aqueous suspension may be obtained by the process for preparing a microparticle based composition as described herein. They may also be obtained by re-dispersing a solid microparticle based composition, as described herein, in an aqueous medium.

The term "aqueous medium" refers to the liquid phase of the composition and comprises an aqueous solvent and optionally compounds dissolved therein, e.g. dispersants as mentioned above, and if present, one or more conventional formulation auxiliaries, such as antifoam agents or preservatives. The aqueous solvent of the aqueous suspension is either water or a mixture thereof with a water-miscible organic solvent, such as $C_1$-$C_4$-alkanols, e.g. methanol, ethanol, n-propanol, isopropanol, n-butanol, 2-butanol, isobutanol, or tert. butanol, $C_2$-$C_5$-alkanediols and $C_3$-$C_8$-alkanetriols, preferably from the group consisting of ethylene glycol, 1,2-propanediol, 1,3-propanediol, glycerol and 1,4-butanediol. Generally, the amount of water in the aqueous solvent is at least 50% by weight, in particular at least 80% by weight or at least 90% by weight, based on the aqueous solvent. The aqueous solvent may consist mainly of water, i.e. water makes up at least 95% by weight of the total amount of solvent present in the suspension. The aqueous solvent may also be a mixture of the aforementioned water-miscible organic solvent and water. In the latter case, the weight ratio of water to water-miscible organic solvent in the aqueous solvent preferably is in the range of from 99:1 to 1:1; more preferably in the range of from 50:1 to 3:1; and most preferably in the range of from 20:1 to 4:1. Expressed differently the amount of organic solvent may be from 1 to 50% by weight, more preferably from 2 to 25% by weight, and most preferably from 5 to 20% by weight, based on the total weight of the aqueous solvent.

The aqueous suspension will usually contain the microparticles in an amount of at least 5% by weight and the amount may be as high as 45% by weight or even higher, in each case based on the total weight of the aqueous suspension and calculated as the total amount of aminoplast-polymer and the IR absorbing pigment. Frequently, the aqueous suspension will contain the microparticles in an amount from 5 to 45% by weight, preferably from 7 to 40% by weight, in particular from 9 to 35% by weight, in each case based on the total weight of the aqueous suspension and calculated as the total amount of aminoplast-polymer and organic IR absorbing pigment. The concentration of pigment in the aqueous suspension will frequently be in the range from 1 to 40% by weight, in particular in the range of 2 to 25% by weight, more particularly in the range from 3 to 20% by weight, especially in the range from 4 to 15% by weight, based on the total weight of the aqueous suspension.

If present, the concentration of the one or more dispersants in the aqueous suspension is frequently be in the range from 0.1 to 20% by weight, preferably from 0.5 to 10% by weight, in particular from 1.0 to 8% by weight, based on the total weight of the aqueous suspension of the microparticles.

The aqueous compositions according to the invention may also comprise customary formulation auxiliaries, such as viscosity-modifying additives (thickeners), antifoam agents, preservatives, buffers, inorganic dispersants, etc., which are usually employed in aqueous formulations of herbicides. Such auxiliaries may be incorporated into the aqueous suspension after step ii) of the preparation process described herein has been carried out. The amount of additives will generally not exceed 10% by weight, in particular 5% by weight of the total weight of the aqueous suspension.

Antifoam agents suitable for the compositions according to the invention are, for example, silicone emulsions (such as, for example, Silicone SRE-PFL from Wacker or Rhodorsil® from Bluestar Silicones), polysiloxanes and modified polysiloxanes including polysiloxane blockpolymers, such as FoamStar® SI and FoamStar® ST products of BASF SE, long-chain alcohols, fatty acids, organofluorine compounds and mixtures thereof.

Suitable preservatives to prevent microbial spoiling of the compositions of the invention include formaldehyde, alkyl esters of p-hydroxybenzoic acid, sodium benzoate, 2-bromo-2-nitropropane-1,3-diol, o-phenylphenol, thiazolinones, such as benzisothiazolinone, 5-chloro-2-methyl-4-isothiazolinone, pentachlorophenol, 2,4-dichlorobenzyl alcohol and mixtures thereof. Commercially available preservatives that are based on isothiazolinones are for example marketed under the trademarks Proxel® (Arch Chemical), Acticide® MBS (Thor Chemie) and Kathon® MK (Rohm & Haas).

If appropriate, the compositions according to the invention, in particular the aqueous suspensions, may comprise buffers to regulate the pH. Examples of buffers are alkali metal salts of weak inorganic or organic acids such as, for example, phosphoric acid, boric acid, acetic acid, propionic acid, citric acid, fumaric acid, tartaric acid, oxalic acid and succinic acid.

According to another particular embodiment the microparticle based compositions of the invention are in the form of solid composition. Such a solid composition contains the microparticles, optionally one or more dispersants, in particular the dispersants described herein as preferred. The solid compositions are in particular in the form of dispersible powders.

The solid composition may be obtained from an aqueous suspension, which is primarily formed in the process for preparing the microparticle based compositions, as described herein, by removing the aqueous phase from the aqueous suspension. Removal of the aqueous phase can be achieved by either separating the aqueous phase from the solid microparticles, e.g. by centrifugation or filtration. Preferably, the aqueous phase is removed by an evaporation process, such as spray drying or freeze drying.

As outlined above, the method for producing the microparticle based compositions of the present invention comprises a first step i), where an aqueous suspension of the solid organic IR absorbing pigment is provided which also includes an aminoplast pre-condensate of one or more amino compounds and one or more aldehydes. In this context, "IR absorbing pigment" has one of the meanings defined herein, in particular one of the preferred meanings.

The IR absorbing pigment is preferably introduced to step i) in the form of a water-moist press cake having a pigment concentration of typically 20 to 60% by weight, preferably 30 to 55% by weight and in particular 35 to 50% by weight, based on the total weight of the press cake. The press cake can be prepared by mixing the particulate pigment with a suitable amount of water in the absence of any dispersant or in the presence of a dispersant, until a homogeneous material is obtained. Alternatively, IR absorbing pigment can be introduced to step i) in a particulate form that is largely devoid of water, e.g. in powdery form.

Suitable aminoplast pre-condensates are oligomeric or polymeric reaction products of one or more aldehydes, such as e.g. formaldehyde, acetaldehyde, propanal, glyoxal or glutaraldehyde, with one or more amino compounds having usually at least two primary amino groups, such as e.g. urea, thiourea, melamine, cyanoguanamine (=dicyandiamide), acetoguanamine and benzoguanamine. The precondensates may be partly or wholly etherified, which means that the hydroxyl groups of the semiaminal units formed upon reaction of the primary amino groups are etherified with an alcohol, preferably with a $C_1$-$C_6$ alkanol such as methanol, ethanol, propanol, n-butanol, 2-butanol, isobutanol, n-pentanol or n-hexanol, and/or a $C_2$-$C_4$-alkandiol, such as ethylene glycol. Upon applying curing conditions the pre-condensates will form crosslinked aminoplast polymers.

Aminoplast pre-condensates include, but are not limited to condensation products of melamine and formaldehyde (melamine-formaldehyde pre-condensates or MF pre-condensates), including wholly or partially etherified MF pre-condensates, urea-formaldehyde pre-condensates (UF pre-condensates), thiourea-formaldehyde pre-condensates (TUF pre-condensates), pre-condensates of melamine, urea and formaldehyde (MUF pre-condensates), including wholly or partially etherified MUF pre-condensates, pre-condensates of melamine, thiourea and formaldehyde (MTUF pre-condensates), including wholly or partially etherified MTUF pre-condensates, urea-glutaraldehyde pre-condensates, benzoguanamine-formaldehyde pre-condensates, dicyandiamide formaldehyde pre-condensates and urea-glyoxal pre-condensates.

Suitable aminoplast pre-condensates for microencapsulation are known and can be found, inter alia, in Kirk-Othmer, Encyclopedia of Chemical Technology, 3rd edition, Vol. 2, pp. 440-469, the prior art cited in the introductory part, U.S. Pat. No. 4,918,317, EP 26914, EP 218887, EP 319337, EP 383,337, EP 415273, DE 19833347, DE 19835114 and WO 01/51197. Suitable pre-condensates are commercially available, e.g. Cymel types, such as but not limited to Cymel® 303, 327, 328 or 385 (etherified melamine formaldehyde resins of Cytec), Maprenal® types, such as but not limited to Maprenal® MF 900w/95, MF 915/751B, MF 920/75WA, MF 921w/85WA, (etherified melamine formaldehyde resins of Ineos), Kauramin® types of BASF SE, such as but not limited to Kauramin® 783, Kauramin® 792 or Kauramin® 753 (melamine formaldehyde resins), Kauramin® 620 or Kauramin® 621 (melamine urea formaldehyde resins), Kaurit® types of BASF SE, such as but not limited to Kaurit® 210, 216, 217, 220, 270, 285, 325 (aqueous solution of urea formaldehyde resins), Luracoll® types, such as Luracoll® SD (etherified melamine formaldehyde resins), Luwipal® types, such as but not limited to Luwipal® 063, Luwipal® 069 (etherified melamine formaldehyde resins), or Plastopal® types, such as but not limited to Plastopal® BTM, Plastopal® BTW (etherified urea formaldehyde resins).

In suitable urea-formaldehyde or thiourea-formaldehyde pre-condensates, the molar ratios of urea or thiourea to formaldehyde are generally in the range of 1:0.8 to 1:4, in particular in the range of 1:1.5 to 1:4, especially in the range of 1:2 to 1:3.5.

In suitable melamine-formaldehyde pre-condensates, which may be wholly or partially etherified, the molar ratios of melamine to formaldehyde are generally in the range of 1:1.5 to 1:10, in particular in the range of 1:3 to 1:8 preferably in the range of 1:4 to 1:6.

In suitable melamine-(thio)urea-formaldehyde pre-condensates, which may be wholly or partially etherified, the molar ratios of melamine+urea or thiourea to formaldehyde are generally in the range of 1:0.8 to 1:9, in particular from 1:2 to 1:8, preferably in the range of 1:3 to 1:6. The molar ratio of urea or thiourea to melamine is usually in the range of 5:1 to 1:50 and in particular in the range of 3:1 to 1:30.

The pre-condensates may be used in the form of etherified pre-condensates of amino compound and aldehyde. In these etherified pre-condensates the methylol groups formed by the reaction of the amino groups with formaldehyde and an alkanol or an alkandiol, in particular with a $C_1$-$C_6$-alkanol, such as methanol, ethanol, n-propanol or n-butanol, in particular methanol, or a $C_2$-$C_4$-alkandiol, such as ethylene glycol. The degree of etherification of these resins can be adjusted by the molar ratio of amino groups to alkanol, which is typically in the range of 10:1 to 1:10, preferably in the range of 2:1 to 1:5.

The pre-condensates are especially selected from the group consisting of melamine-formaldehyde pre-condensates, including wholly or partially etherified melamine-formaldehyde pre-condensates melamine-urea-formaldehyde pre-condensates and wholly or partially etherified melamine-formaldehyde pre-condensates, and mixtures thereof. Especially, the pre-condensate is a wholly or partially etherified melamine-formaldehyde condensate, which may contain small amounts, e.g. 1 to 20 mol.-%, based on melamine, of urea.

The aqueous suspension according to step i) can be obtained by incorporating the particulate pigment and the aminoplast pre-condensate into an aqueous medium, such as water. Preferably, the aqueous suspension in addition contains at least one dispersant which is preferably selected from the dispersants described herein as optional components of the inventive microparticle based compositions, in particular from those described as being preferred. The aqueous suspension may contain the dispersant in an amount that represents a portion or the total quantity intended to be included in the final microparticle based composition.

The aqueous suspension provided in step i) may contain further auxiliaries destined for the inventive microparticle based compositions, such as in particular one of the antifoam agents described herein. In one embodiment of the present invention a portion or the full amount of the antifoam agent intended to be included in the final microparticle based composition is already present in the suspension.

The aqueous suspension contains the aminoplast pre-condensate in an amount that is usually within the range from 20 to 65% by weight, in particular from 25 to 57% by weight and especially from 27 to 52% by weight, based on the total weight of aminoplast pre-condensate and the organic IR absorbing pigment and calculated as solid organic matter.

In step i) the pigment is present in the suspension in particulate form. The particle size distribution of the particles of the IR absorbing organic pigment is typically characterized by having a particle size, which is smaller than the particle size of the microparticles containing the solid particles of the IR-absorbing organic pigment, which are surrounded or embedded by an aminoplast polymer. Frequently, the particle size distribution of the particles of the IR absorbing organic pigment is characterized by having a D(v, 0.5) value of most 0.8 µm, in particular at most 0.5 µm and especially at most 0.3 µm, e.g. in the range from 10 to 800 nm, in particular from 20 to 500 nm, more particularly in the range from 20 to 300 nm, as determined by static light scattering. In the suspension, the particles of the IR absorbing organic pigment, may however form loose agglomerates and thus the apparent particle size may be larger. However, the particle size distribution of primary particles of the particles of the IR absorbing organic pigment, which form the agglomerate, is usually characterized by having a D(v, 0.5) in the above ranges.

IR absorbing pigments that are suitable for the inventive microparticle based compositions can be obtained e.g. from chemical synthesis or commercial sources having already an appropriate particle size distribution as well as a median particle diameter D(v 0.5) in the aforementioned ranges. In case the particles of the pigment to be used are too coarse, the particle size can be reduced by using established particle communition methods, including in particular communition techniques involving water or an organic solvent and grinding media like beads or inorganic salts. Suitable methods and-devices are known and have been described e.g. in Perry's Chemical Engineers' Handbook, 7th ed. McGraw Hill 1997, 20-31 to 20-38, and the literature cited therein, and are commercially available, e.g. from Netzsch Feinmahltechnik, FHZ GmbH, Hosokawa-Alpine AG, Willy A. Bachofen AG Maschinenfabrik, Coperion and Buhler GmbH.

The IR absorbing pigment present in the suspension of step i) may be subjected to a desagglomeration during or preferably prior to step ii). Thereby agglomerates of the pigment particles contained in the suspension will be broken up. Desagglomeration (sometimes also spelled disagglomeration) can be achieved by applying strong shear forces to the suspension, e.g. by using a disperser or homogenizer, such as a disc homogenizers or rotor stator homogenizers, or by applying ultrasound. Suitable homogenizers are well known and commercially available, e.g. from Netzsch Feinmahltechnik or from IKA-Werke GmbH&Co. KG. The application of ultrasound for desagglomeration of particles in the liquid phase has been frequently described e.g. in WO 99/32220 or by U Teipel et al., Int. J. Mineral Processing Vol. 74, Supplement (2004), S183-S190. The desagglomeration is typically continued until an particle size distribution as well as a median particle diameter D(v 0.5) within the aforementioned ranges is obtained.

The aqueous suspension is prepared in step i) under conditions preventing any significant polycondensation of the aminoplast pre-condensate at this stage. This is particularly achieved by adjusting the pH to at least pH 6, e.g. from pH 6 to pH 9. In order to obtain a homogenous mixture the components of the aqueous suspension, i.e. the pigment particles, typically a detergent, an aminoplast pre-condensate and optionally auxiliaries, such as in particular an antifoam agent, are combined and vigorously agitated by typically using a high performance blender, such as in particular disc dispersers using shaped toothed disc with high peripheral tip speeds (e.g. from Vollrath GmbH), Ultra-turrax dispersers (IKA®-Werke GmbH & Co) and/or ultrasonic devices, such as ultrosonic tips. Preferably, the mixture is dispersed with a disc disperser or, alternatively, is initially dispersed with an Ultra-turrax disperser and afterwards treated with an ultrasonic tip with cooling.

In step ii) of the inventive method to produce the microparticle based compositions of the invention the polycondensation of the aminoplast pre-condensate in the aqueous suspension obtained in step i) is effected in the presence of one or more surfactants, which are preferably selected from the dispersants described herein as optional components of the inventive microparticle based compositions. Thus, depending on the amount of such dispersant already added to the suspension in step i), a further amount of dispersant may be added in step ii) up to the entire quantity of dispersant intended to be included in the final microparticle based compositions. Preferably, however, the quantity of dispersant intended to be included in the final composition is already added in step i).

Accordingly, it is preferred that the one or more surfactants contained in the aqueous suspension in which the polycondensation is effected in step ii), are selected from the dispersants described herein as optional components of the microparticle based compositions according to the present invention. The one or more surfactants, i.e. especially the one or more dispersants defined herein, are typically used in such an amount in step ii) that the weight ratio of the surfactant to the solid organic IR absorbing pigment is in the range from 0.05:1 to 1:1, preferably in the range from 0.1:1 to 0.8:1, in particular from 0.1:1 to 0.5:1.

The concentration of the aminoplast pre-condensate in the aqueous suspension subjected to polycondensation in step ii) is frequently in the range of 0.5 to 30% by weight, preferably from 1.0 to 25% by weight, in particular from 2.0 to 20% by weight, based on the total weight of the suspension.

The concentration of the pigment in the aqueous suspension subjected to polycondensation is usually in the range from 1 to 40% by weight, in particular in the range of 2 to 25% by weight, more particularly in the range from 3 to 20% by weight, especially in the range from 4 to 15% by weight of the total weight of the suspension.

The polycondensation of the aminoplast pre-condensate can be effected in a well-known manner, e.g. by adjusting the pH of suspension obtained in step i) to a value of at most pH 5.5 and heating it to a certain reaction temperature, which are suitable conditions to initiate and conduct the polycondensation. During the polycondensation, the aminoplast pre-condensate is converted into a water-insoluble aminoplast resin, which precipitates from the aqueous phase and deposits preferably on the surface of the solid particles pigment material, thereby embedding or surrounding the pigment particles to obtain pigment-polymer particles.

According to the invention, the polycondensation of the aminoplast is performed at a pH of at most pH 5.5, in particular at a pH of at most pH 5, especially at a pH of at most pH 4, e.g. in the range of pH 0 to 5, more particularly in the range from pH 1 to 4 or in the range from pH 2 to 4.

The pH of the aqueous suspension is usually adjusted by addition of suitable amounts of an organic or inorganic acid, such as sulfuric acid, hydrochloric acid, phosphoric acid, a carboxylic acid including alkanoic acids, alkandioic acids or hydroxycarboxylic acids, such as formic acid, acetic acid, propionic acid, oxalic acid, malic acid or citric acid, and alkyl or arylsulfonic acids, such as methanesulfonic acid or toluenesulfonic acid. Preferably, the acid catalyst is selected from the group consisting of formic acid, sulfuric acid, methane sulfonic acid and hydrochloric acid, and in particular is formic acid. It is preferred, but not mandatory, if at least a portion, in particular the majority of the acid, is present in the aqueous suspension, before the aqueous suspension is heated to the reaction temperature.

Preferably, the polycondensation of the aminoplast pre-condensate is performed at elevated temperature, in particular at a temperature of at least 50° C., in particular at least 60° C. and may be as high as 100° C. Preferably, the temperature where polycondensation of the aminoplast pre-condensate is performed does not exceed 95° C., in particular 90° C. and is preferably in the range of 50 to 95° C., in particular in the range of 60 to 90° C. or in the range of 70 to 90° C. It may be possible to initiate the polycondensation of the aminoplast at a comparatively low temperature, e.g. a temperature in the range of 40 to 60° C., and then complete the polycondensation reaction at a higher temperature of e.g. 60 to 95° C. or 70 to 90° C.

The time for completing the polycondensation may vary, depending on the reactivity of the pre-condensate, the temperature and the pH of the aqueous suspension and may take from 0.3 h to 10 h, in particular from 0.5 h to 5 h.

The thus obtained aqueous suspension of the pigment-polymer particles may be neutralized by the addition of a base. Preferably, the pH of the suspension is adjusted to a pH of at least 6, e.g. a pH in the range of pH 6 to 10, in particular in the range of pH 6.5 to 9.0. Suitable bases include, but are not limited to organic amines, in particular water soluble amines, such as mono-, di- and triethanol amine. However, inorganic basis, such as potassium hydroxide or sodium hydroxide may be used. However, for the purpose of the invention, such a neutralization is not necessary.

The aqueous suspensions of pigment-polymer particles, which are obtainable by the process of the present invention, qualify as a microparticle based compositions of the invention. In these aqueous suspensions, the pigment-polymer particles contain a pigment and an aminoplast resin, which surrounds or embeds the pigment.

The aqueous suspensions of pigment-polymer particles further contain one or more surfactants as defined above, which are preferably selected from the dispersants described herein in detail, such as in particular those mentioned as preferred.

From the aqueous suspensions obtained by the process as described herein, the pigment-polymer particles can be isolated, e.g. by filtration or centrifugation, or the aqueous suspension may be spray-dried, granulated or freeze-dried, to obtain a solid composition in the form of a powder or granules. The solid composition may be re-suspended or formulated by using formulation auxiliaries as described herein, such as e.g. viscosity-modifying additives (thickeners), antifoam agents, preservatives, buffers, inorganic dispersants and others, which are usually employed in aqueous formulations.

The microparticle compositions of the present invention, in the form of an aqueous suspension of the microparticles as well as in the form of a solid composition of the microparticles, such as powders, can be used for printing ink formulations, which are particularly suitable for security printing.

Security features, e.g. for security documents, can be classified into "covert" and "overt" security features. The protection provided by covert security features relies on the concept that such features are hidden, typically requiring specialized equipment and knowledge for their detection, whereas "overt" security features are easily detectable with the unaided human senses, e.g. such features may be visible and/or detectable via the tactile senses while still being difficult to produce and/or to copy. Security printing of "covert" security feature generally comprises printing on a substrate an image that is invisible or otherwise undetectable under ambient conditions, and which can be rendered visible or detectable by applying a suitable stimulus. The stimulus may, for example, be electromagnetic radiation or heat.

Specifically, the printing formulations of the present invention enable coating or printing a security image on a substrate. Since the inventive printing formulation comprises IR absorbing pigments, these pigments are consequently also part of the image coated or printed on the substrate. By using devices capable of measuring IR radiation it is then possible to detect the otherwise undetectable image on the basis of the extent to which the IR radiation is absorbed, in particular the radiated wavelengths in the range of 750 to 1100 nm, especially in the range of 790 to 1100 nm. This way the specific security image can be identified on the substrate.

The printing formulations of the invention are particularly suitable for this type of security printing, as they enable security images exhibiting radiation reflectance of wavelengths in the range of 750 to 1100 nm, especially of 790 to 1100 nm, that is reduced by at least 40%, in particular at least 50%, in comparison to the blank substrate.

The printing ink formulations of the present invention, in particular those applicable for security printing, contain, besides a microparticle based composition as defined herein, a binder which, in principle, can be selected from any binder known in the art to be suitable for formulating printing inks. More particularly, binders for the inventive printing ink formulations are selected from binders that are either radiation curable, or can be thermally dried, or can be oxidatively dried and, accordingly, give rise to ink formulations that are either radiation curable, or can be thermally dried, or can be oxidatively dried. Oxidatively drying binders and the oxidatively drying inks obtained thereof are particularly preferred within the context of the invention.

Examples of radiation curable binders, such as in particular UV-curable ones, are binders containing oligomers and monomers with ethylenically unsaturated double bonds. The oligomers are typically selected from polyether (meth)acrylates, i.e. polyethers having acrylic or methacrylic groups, polyester (meth)acrylates, i.e. polyesters having acrylic or methacrylic groups, and urethane (meth)acrylates, i.e. oligomers which have a (poly)urethane structure and have acrylic or methacrylic groups, for example reaction products of polyisocyanates with hydroxy-functionalized acrylic or methacrylic compounds, and mixtures of these. Preferably, the oligomers are polyester acrylates, urethane acrylates and mixtures of these. The monomers are typically selected from esters of acrylic acid with mono- to tetrahydric (cyclo) aliphatic alcohols, such as trimethylolpropane diacrylate, trimethylolpropane triacrylate, ethylene glycol diacrylate, butanediol diacrylate, hexanediol diacrylate, dipropylene glycol diacrylate, tripropylene glycol diacrylate, phenoxyethyl acrylate, furfuryl acrylate, tetrahydrofurfuryl acrylate, 4-tert-butylcyclohexyl acrylate, 4-hydroxybutyl acrylate, and trimethylolformal monoacrylate (5-ethyl-1,3-dioxan-5-yl)methyl ester of acrylic acid).

Examples of thermally or oxidatively drying binders are alkyd resins, such as in particular long oil alkyd resins, polyamide resins, (meth)acrylic resins, polyurethane resins, phenolic resins, vinyl resins, rosin modified maleic resins and varnishes made by cooking a resin, such as an alkyd, polyurethane or phenolic resin, with an oxidative drying oil, such as tung oil, linseed oil, poppy seed oil or perilla oil, as well as mixtures of these resins and vanishes. The aforementioned resins and varnishes are well known and e.g. described in more detail by R. van Gorkum et al., Coordination Chemistry Reviews 249 (2005) 1709-1728; J. F. Black, J. Am. Chem. Soc., 1978, 100, 527, J. Mallégol et al., Prog. Org. Coatings 39 (2000) 107-113, The Printing ink manual, R. H. Leach and R. J. Pierce, Springer Edition, $5^{th}$ Edition and commercially available, e.g. from Epple Druckfarben AG.

Security ink comprising the herein disclosed microparticles may be
    an oxidative drying security ink comprising besides the microparticles and the oxidatively drying binder(s), from about 0.01 to about 10% by weight, based on the total weight of the oxidative drying security ink, of one or more driers, or
    a UV-Vis curable security ink comprising besides the microparticles and the UV-Vis curable binder(s) from about 0.1 to about 20% by weight, based on the total weight of the UV-Vis curable security ink, of one or more photoinitiators, or a thermally drying security ink comprising besides the microparticles and the thermally drying binder(s), from about 10 to about 90% by weight, based on the total weight of the thermally drying security ink, of one or more solvents selected from the group consisting of organic solvents, water and mixtures thereof, or a combination of the aforementioned security inks.

Particular preference is given herein to printing ink formulations comprising at least one oxidatively drying binder which is especially selected from alkyd resins, such as in particular long oil alkyd resins, polyamide resins, (meth) acrylic resins, vinyl resins, rosin modified maleic resins, varnishes made by cooking an alkyd, polyurethane or phenolic resin with tung or linseed oil optionally followed by dissolution in an organic solvent, such as mineral oil, as well as mixtures of these resins and varnishes.

The printing ink formulations of the invention typically comprise further auxiliaries and components that are customarily included in inks, such as e.g. pigments and colorants, fillers, e.g. alumina, calcium carbonate or china clay, dyers, e.g. cobalt carboxylate or manganese carboxylate, solvents, surfactants, waxes, UV-stabilizer, photoinitiators, antioxidants, emulsifiers, slip agents, etc.

In the following formulations A to D serve as specific examples of the printing ink formulations of the present invention, where the individual components have the meanings defined herein, in particular the preferred meanings.

Formulation A: an oxidatively drying intaglio ink formulation:

| | |
|---|---|
| 10-30% by weight | oxidatively drying resin; |
| 0-15% by weight | pigment; |
| 1-10% by weight | microparticle composition of the invention comprising organic IR absorbing pigment, preferably in the form of a solid composition of the microparticles; |
| 10-50% by weight | filler; |
| 5-20% by weight | solvent; |
| 0.1-3% by weight | dryer; |
| 1-7% by weight | wax; |
| 1-10% by weight | surfactant; |
| 0.1-5% by weight | additives, e.g. slip agent, anti-oxidant or stabilizer. |

Formulation B: an UV-curable intaglio ink formulation:

| | |
|---|---|
| 20-35% by weight | oligomers; |
| 10-30% by weight | monomers; |
| 0-20% by weight | pigment; |
| 1-10% by weight | microparticle composition of the invention comprising organic IR absorbing pigment, preferably in the form of a solid composition of the microparticles; |
| 10-50% by weight | filler; |
| 1-10% by weight | photoinitiator; |
| 1-3% by weight | UV-stabilizer; |
| 1-5% by weight | additives, e.g. emulsifier. |

Formulation C: a heatset or heat drying intaglio ink formulation:

| | |
|---|---|
| 25-35% by weight | thermally drying resin; |
| 0-5% by weight | pigment; |
| 1-10% by weight | microparticle composition of the invention comprising organic IR absorbing pigment, preferably in the form of a solid composition of the microparticles; |
| 45-50% by weight | filler; |
| 10-15% by weight | solvent; |
| 0.5-2% by weight | dryer; |
| 1-5% by weight | wax. |

Formulation D: an oxidatively drying offset ink formulation:

| | |
|---|---|
| 20-40% by weight | varnish I: oxidatively drying resin, such as an alkyd resin; |
| 30-50% by weight | varnish II: oxidatively drying resin prepared by cooking a resin, such as an alkyd, polyurethane or phenolic resin, in particular a phenolic resin, with a drying oil, such as tung oil; |
| 10-20% by weight | pigment; |
| 1-10% by weight | microparticle composition of the invention comprising organic IR absorbing pigment, preferably in the form of a solid composition of the microparticles; |
| 1-7% by weight | wax; |
| 0.1-0.5% by weight | antioxidant; |
| 1-5% by weight | dryer. |

The present invention also relates to a method for producing a security feature or a security document, which comprises applying a printing ink formulation to a substrate by a printing process.

The printing ink formulations of the invention may be applied by a printing process preferably selected from the group consisting of offset-printing processes, rotogravure printing processes, silkscreen printing processes, copperplate intaglio printing processes, flexographic printing processes, letterpress printing processes; more preferably by offset-printing processes and copperplate intaglio printing processes. The aforementioned printing techniques are well known to a skilled person.

In this context, the term "security feature" is in particular a specific image that is printed on a substrate; and term "substrate" means any object which is intended to be furnished with a security feature, or intended to be converted into a security document by applying the ink formulation in order to produce a security feature.

The term "security document" means any document intended to be protected against forgery or counterfeiting. Such security documents include in particular value documents and value commercial goods. Typical example of value documents include e.g. banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include e.g. labels, such as authentication brand labels, tamper evidence labels and seals. It is pointed out that the disclosed substrates, value documents and value commercial goods are given exclusively for exemplifying purposes, without restricting the scope of the invention.

Alternatively, the inventive printing ink formulation comprising microparticles which include an organic IR absorbing pigment may be printed onto an auxiliary substrate such as for example a security thread, security stripe, a foil, a decal, a window or a label and subsequently transferred to a security document in a separate step.

Besides being used for protecting and authenticating a security document, as described above, the printing ink formulations of the present invention can also be employed for decorative purposes by applying the formulations to objects or elements to be decorated. Typically examples of such objects or elements include e.g. luxury goods, cosmetic packaging, automotive parts, electronic/electrical appliances, furniture and fingernail lacquers.

Accordingly, the present invention also relates to security documents as well as decorative objects that comprise a substrate, onto which a printing ink formulation of the invention has been applied by a printing process.

FIG. 1: The diagram displays the relative decrease in absorption as calculated from the remission of a print measured at the absorption maximum of the inventive and comparative printing inks of application example 3.

Particle Size Distribution (PSD) was determined by laser diffraction using a Malvern Mastersizer 2000 according to European norm ISO 13320:2009 E N. The data were treated according to the Mie-Theory by software using a "universal model" provided by Malvern Instruments. Important parameters are the in particular the following values: D(v 0.5), D(v 0.9), D(v 0.1), D(3,2) and D(4,3), where D(v 0.5), D(v 0.9), D(v 0.1), D(3,2) and D(4,3) are as defined herein.

Aminoplast pre-condensate A: 70 wt.-% aqueous solution of a methylolated melamine formaldehyde pre-condensate: Luracoll® SD, BASF SE.

Pigment A: IR absorbing nickel dithiolene complex pigment of formula (I), where $R^1$, $R^2$, $R^3$ and $R^4$ are aryl: CAS name [nickel(II), bis(diphenylimidazolidinetrithione-κS4, κS5-), (SP-4-1)-].

Pigment B: IR absorbing copper naphthalocyanine complex pigment of the formula B-6 of EP 3067216.

Pigment C: IR absorbing nickel dithiolene complex pigment of formula (I), where $R^1$, $R^2$, $R^3$ and $R^4$ are methyl.

Pigment D: IR absorbing nickel dithiolene complex pigment of formula (I), where $R^1$, $R^2$, $R^3$ and $R^4$ are isopropyl.

Dispersant A: Commercially available type I dispersant (40% by weight aqueous solution of copolymer having repeating units of butyl acrylate, methylpolyethylenoxide acrylate and vinylpyridine, prepared according to example A6 of WO 2006/074969).

Dispersant B: Type III dispersant (water containing mixture of a fatty acid modified pentamethylene hexamine and a semiester of an ethoxylated fatty acid with maleic acid, having a solid content of 97% by weight).

Antifoam agent A: modified polydimethyl siloxane: Foamstar® SL 2280, BASF SE

PREPARATION EXAMPLES

Example 1a 29.91 g of a wet cake of pigment A (46.8% pigment by weight) were mixed with 20 g of dispersant A and 0.4 g of antifoam agent A as well as 12.25 g of aminoplast pre-condensate A in 108.53 g of water. This mixture was pre-dispersed using an Ultra-turrax and then subjected to ultrasound using an ultrasonic tip under ice-cooling for 10 minutes. Afterwards, 4 g of a aqueous solution of formic acid (20% by weight) was added. The mixture was stirred for 1 hour at room temperature. Then the temperature was increased to 80° C. within one hour, held at 80° C. for 2 hours and then cooled to room temperature. A dispersion of encapsulated pigment was obtained. The characteristic values of the particle size distribution and the relative amount of pigment to aminoplast are given in Table 1. This dispersion was then dried yielding a fine powder.

Examples 1 b and 1c are repetitions of Example 1a. The characteristic values of the particle size distribution are given in Table 1.

Example 2

33.12 g of a wet cake of pigment A (46.8% pigment by weight) were mixed with 20 g of dispersant A and 0.4 g of antifoam agent A as well as 9.19 g of aminoplast pre-condensate A in 105.82 g of water. This mixture was then treated in the same way as described in Example 1a. The characteristic values of the particle size distribution and the relative amount of pigment to aminoplast are given in Table 1.

Example 3

32.05 g of a wet cake of pigment A (46.8% pigment by weight) were mixed with 20 g of dispersant A and 0.4 g of antifoam agent A as well as 10.21 g of aminoplast pre-condensate A in 106.72 g of water. This mixture was then treated in the same way as described in Example 1a. The characteristic values of the particle size distribution and the relative amount of pigment to aminoplast are given in Table 1.

Example 4

30.98 g of a wet cake of pigment A (46.8% pigment by weight) were mixed with 20 g of dispersant A and 0.4 g of antifoam agent A as well as 11.23 g of aminoplast pre-condensate A in 107.63 g of water. This mixture was then treated in the same way as described in Example 1a. The characteristic values of the particle size distribution and the relative amount of pigment to aminoplast are given in Table 1.

Example 5

28.85 g of a wet cake of pigment A (46.8% pigment by weight) were mixed with 20 g of dispersant A and 0.4 g of antifoam agent A as well as 13.27 g of aminoplast pre-condensate A in 109.5 g of water. This mixture was then treated in the same way as described in Example 1a. The characteristic values of the particle size distribution and the relative amount of pigment to aminoplast are given in Table 1.

Example 6

27.78 g of a wet cake of pigment A (46.8% pigment by weight) were mixed with 20 g of dispersant A and 0.4 g of antifoam agent A as well as 14.29 g of aminoplast pre-condensate A in 109.5 g of water. This mixture was then treated in the same way as described in Example 1a. The characteristic values of the particle size distribution and the relative amount of pigment to aminoplast are given in Table 1.

Example 7

155.44 g of a wet cake of pigment A (38.60% pigment by weight) were mixed with 25 g of dispersant A and 2.0 g of antifoam agent A as well as 81.66 g of aminoplast pre-condensate A in 449.55 g of water. This mixture was dispersed using a disc disperser with a stirring speed of 10 000 rpm. Afterwards, 20 g of a 20% by weight solution of formic acid was added. The mixture was stirred for 1 hour at room temperature. This mixture was then treated in the same way as described in Example 1a. The characteristic values of the particle size distribution and the relative amount of pigment to aminoplast are given in Table 1.

Example 8

29.91 g of a wet cake of pigment A (46.8% pigment by weight) were mixed with 5.0 g of dispersant A and 0.4 g of antifoam agent A as well as 12.25 g of aminoplast pre-condensate A in 63.55 g of water. This mixture was then treated in the same way as described in Example 1a. The characteristic values of the particle size distribution and the relative amount of pigment to aminoplast are given in Table 1.

Example 9

33.10 g of a wet cake of pigment A (42.3% pigment by weight) were mixed with 8.24 g of dispersant B and 0.4 g of antifoam agent A as well as 12.25 g of aminoplast pre-condensate A in 63.55 g of water. This mixture was then treated in the same way as described in Example 1a. The characteristic values of the particle size distribution and the relative amount of pigment to aminoplast are given in Table 1.

TABLE 1

|  | P/A[1] | D(v 0.1) [µm] | D(v 0.5) [µm] | D(v 0.9) [µm] | D(3.2) [µm] | D(4.3) [µm] |
|---|---|---|---|---|---|---|
| Example 1a | 2.3 | 4.17 | 6.35 | 9.57 | 6.02 | 6.66 |
| Example 1b | 2.3 | 4.16 | 6.36 | 9.60 | 6.01 | 6.67 |
| Example 1c | 2.3 | 3.79 | 5.68 | 8.43 | 5.40 | 5.94 |
| Example 2 | 3.4 | 2.53 | 3.96 | 6.41 | 3.76 | 4.25 |
| Example 3 | 3.0 | 2.80 | 4.91 | 8.55 | 4.50 | 5.35 |
| Example 4 | 2.6 | 2.84 | 4.95 | 8.63 | 4.54 | 5.39 |
| Example 5 | 2.1 | 3.95 | 5.97 | 8.93 | 5.67 | 6.25 |
| Example 6 | 1.9 | 4.11 | 6.22 | 9.30 | 5.90 | 6.51 |
| Example 7 | 1.5 | 4.41 | 6.77 | 10.24 | 6.49 | 7.10 |
| Example 8 | 2.3 | 2.17 | 3.37 | 5.56 | 3.22 | 3.66 |
| Example 9 | 2.3 | 5.40 | 8.85 | 14.16 | 8.2 | 9.41 |

[1]P/A: Calculated weight ratio of pigment to aminoplast in the final particle

Microparticle based compositions of the pigments B, C and D can be prepared by analogy to procedures described examples 1a to 9.

APPLICATION EXAMPLES

Application Example 1: Preparation of Ink Formulation for Offset Printing (General Procedure)

1 part of the solid, powdery microparticle composition of the invention was incorporated into 9 parts of a commercial, oxidatively drying offset varnish. The mixture is homogenized using a three roll mill.

Application Example 2: Comparison of Prints with Adjusted IR Absorption

An offset ink formulation according the invention consisting of 10% by weight of the solid microparticle composition of Example 1a in a commercial oxidatively drying offset varnish (Glanzdrucklack 1188, Epple AG) was prepared as described above. The ink was printed on paper (APCO II/II paper; Fogra Forschungsgesellschaft Druck e.V.), using an offset printing equipment (Prüfbau). An accordingly prepared ink formulation including 4% by weight of the non-encapsulated pigment A was chosen as a comparative formulation and printed, because it was found to produce an offset paper print having almost the same IR remission in the wavelength range of 750-1100 nm as a print of the inventive ink formulation, when measured with a NIR spectrometer (Datacolor 451R) directly after printing. Both prints were measured again after 20 days. The obtained results showed that after this period the increase of remission of the prints prepared with the comparative ink is 25% higher than the increase of remission of the prints prepared with the inventive ink (measured at the absorption maximum of the ink).

Application Example 3: Comparison of Prints Prepared with Inks Having the Same Pigment Concentration An offset ink formulation according the invention of the solid microparticle composition of Example 1c in a non-commercial oxidatively drying offset varnish was prepared as described above. The pigment concentration was 4% by weight. A comparative ink was prepared in a similar manner but using non-encapsulated pigment A with a pigment concentration of 4%. The inventive ink formulation and the comparative ink formulation were printed on paper (APCO II/II paper; Fogra Forschungsgesellschaft Druck e.V.), using an offset printing equipment (Prüfbau) in such a way that in each case an ink concentration of 2 g/m$^2$ (pigment loading of 4%) of paper was obtained. The IR remissions in the wavelength range of 750 to 1100 nm of the prints were monitored for 20 days with a NIR spectrometer (Datacolor 451R). The relative decrease in absorption measured at the absorption maximum of the ink (as calculated from the remission) is displayed in FIG. 1.

Application Example 4: Comparison of Prints Prepared with Inks Having the Same Pigment Concentration An oxidatively drying offset ink formulation according the invention of the solid microparticle composition of Example 7 in a commercial oxidatively drying offset varnish (Matt 2154, Epple AG) was prepared as described above. The pigment concentration was 4% by weight. A comparative ink was prepared in a similar manner but using non-encapsulated pigment A with a pigment concentration of 4%. The inventive ink formulation and the comparative ink formulation were printed on paper (APCO II/II paper; Fogra Forschungsgesellschaft Druck e.V.), using an offset printing equipment (Prüfbau) in such a way that in each case an ink loading of 1 g/m$^2$ (pigment concentration of 4%) of paper was obtained. The IR remissions in the wavelength range of 750 to 1100 nm of the prints were measured with a NIR spectrometer (Datacolor 45IR) directly after printing and again after 6 days. Over this period the remission of the print obtained with the comparative ink had increased by 37% relative to the measured starting remission, and the print obtained with the inventive ink by just 7%.

We claim:

1. A microparticle based pigment composition of an organic IR absorbing pigment, which is a polyunsaturated polycyclic organic compound or metal organic compound having a main absorption maximum in the range from 750 to 1100 nm, wherein the microparticles of the pigment composition contain the organic IR absorbing pigment as solid particles, which are surrounded by or embedded in an aminoplast polymer, which is a polycondensation product of one or more amino compounds and one or more aldehydes, where the microparticle based pigment composition is characterized by a volume based particle size distribution, as determined by static light scattering according to ISO 13320:2009 EN, having a volume-averaged mean D (4,3) value in the range from 1.0 to 15.0 µm, wherein the amount of aminoplast polymer in the microparticle composition is from 15 to 50% by weight, based on the total weight of aminoplast polymer and the organic IR absorbing pigment and the amount of organic IR absorbing pigment is from 50 to 85% by weight, based on the total weight of the aminoplast polymer and the organic IR absorbing pigment;
wherein the microparticle based pigment composition is an aqueous suspension of the microparticles or a solid composition of the microparticles.

2. The composition of claim 1, wherein the aminoplast polymer is a melamine formaldehyde resin.

3. The composition of claim 1, wherein the organic IR absorbing pigment is selected from the group consisting of metal dithiolene complexes, phthalocyanine pigments, naphthalocyanine pigments, rylene pigments, polymethine pigments, anthraquinone pigments and mixtures thereof.

4. The composition of claim 3, wherein the organic IR absorbing pigment is selected from the group consisting of metal dithiolene complexes of the formula (I),

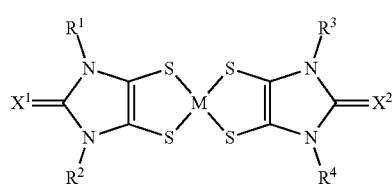

wherein
M is Ni, Pd or Pt,
$X^1$, $X^2$, independently of each other, are O or S,
$R^1$, $R^2$, $R^3$, $R^4$, are identical or different and selected from the group consisting of alkyl, where 1 or more non-adjacent $CH_2$ radicals of alkyl may be replaced by O, alkenyl, aryl and hetaryl, where aryl and hetaryl are unsubstituted or substituted, and naphthaloycyanine complexes or the formula (II)

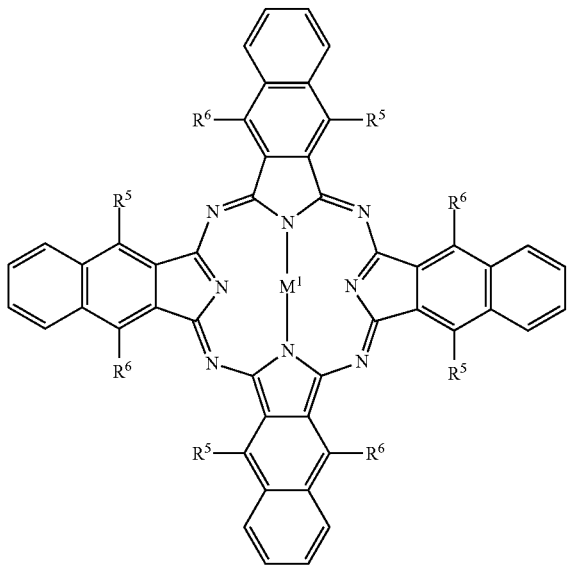

where
$M^1$ is Cu, Fe, Mn, Pd, Pt, VO, Si $(OR^8)_2$, Al $(R^7)$ or Ga $(R^7)$,
$R^5$ H, F, $OR^9$, $SR^9$, $NHR^{10}NR^{10}R^{11}$,
$R^6$ H, F, $OR^9$, $SR^9$, $NHR^{10}NR^{10}R^{11}$,
$R^7$ is selected from the group consisting of Cl, OH and $OR^{12}$;
$R^8$ is selected from the group consisting of $C_1$-$C_{12}$-alkyl, $(C_2H_4O)_m$—$R^{13}$ and phenyl;
$R^9$ is selected from the group consisting of $C_1$-$C_{12}$-alkyl, $(C_2H_4O)_m$—$R^{13}$ and phenyl;
$R^{10}$, $R^{11}$ independently of each other are selected from the group consisting of $C_1$-$C_{12}$-alkyl, $(C_2H_4O)_n$—$R^{13}$ and phenyl or
$R^{10}$, $R^{11}$ together form a 5- or 6-membered saturated N-heterocyclic ring, which is substituted by 0, 1 or 2 methyl groups;
$R^{12}$ is selected from the group consisting of $C_1$-$C_{12}$-alkyl, $(C_2H_4O)_n$—$R^{13}$ and phenyl;
$R^{13}$ is $C_1$-$C_{12}$-alkyl, and
n, m independently of each other are 0, 1, 2, 3 or 4.

5. The composition of claim 1, which contains at least one dispersant selected from the group consisting of
nonionic or anionic polymeric dispersant having a plurality of poly (oxy-$C_2$-$C_4$-alkylene) groups,
acidic polyetheresters bearing at least one poly (oxy-$C_2$-$C_4$-alkylene) group, or mixtures thereof with poly (oxy-$C_2$-$C_4$-alkylene) glycols and/or anionic surfactants, and
mixtures of modified polyamines with anionic surfactants bearing at least one poly (oxy-$C_2$-$C_4$-alkylene) group.

6. The composition of claim 1, which is an aqueous suspension of the microparticles.

7. The composition of claim 1, which is solid composition of the microparticles.

8. A method for producing the microparticle based pigment composition of claim 1 which comprises the following steps:
i) providing an aqueous suspension of the solid organic IR absorbing pigment particles which also contains an aminoplast pre-condensate of one or more amino compounds and one or more aldehydes;

ii) effecting the polycondensation of the aminoplast pre-condensate in the aqueous suspension of the solid organic IR absorbing pigment in the presence of at least one surfactant.

9. The method of claim 8, where the particles of the solid organic IR absorbing pigment in the aqueous suspension are characterized by a volume based particle size distribution, as determined by static light scattering according to ISO 13320:2009 EN, having a volume median particle diameter D (v 0.5) of at most 0.8 μm.

10. The method of claim 8, wherein the weight ratio of the surfactant to the solid organic IR absorbing pigment is in the range from 0.05:1 to 1:1.

11. The method of claim 8, wherein the aqueous suspension of the solid organic IR absorbing pigment is subjected to a desagglomeration prior to step ii).

12. The use of a microparticle composition of claim 1 for the manufacture of a printing ink formulation for security printing.

13. A printing ink formulation containing a microparticle based pigment composition of claim 1 and a binder.

14. The printing ink formulation of claim 13, where the binder comprises at least one oxidatively drying resin.

15. A method for producing a security feature or a security document, which comprises applying the printing ink formulation of claim 13 to a substrate by a printing process.

16. A security document comprising a substrate, onto which a printing ink formulation of claim 13 has been applied by a printing process.

17. A method for producing a security feature or a security document, which comprises applying the printing ink formulation of claim 14 to a substrate by a printing process selected from the group consisting of copperplate intaglio printing, offset-printing, gravure-printing, silkscreen-printing, flexography, and combinations thereof.

18. A method for producing a security feature or a security document, which comprises applying the printing ink formulation of claim 14 to a substrate by a printing process selected from the group consisting of copperplate intaglio printing, offset-printing or silkscreen-printing.

19. The composition according to claim 1, wherein the composition is obtained by a method comprising:

i) providing an aqueous suspension of the solid organic IR absorbing pigment particles which also contains an aminoplast pre-condensate of one or more amino compounds and one or more aldehydes;

ii) effecting the polycondensation of the aminoplast pre-condensate in the aqueous suspension of the solid organic IR absorbing pigment in the presence of at least one surfactant.

20. The composition according to claim 19, wherein the aqueous suspension provided in step i) consists of the solid organic IR absorbing pigment particles, the aminoplast pre-condensate, the one or more aldehydes, and optionally at least one dispersant.

21. The composition according to claim 19, wherein the aminoplast polymer is deposited directly on the organic IR absorbing pigment.

22. The composition according to claim 1, wherein the microparticles consist of the aminoplast polymer and the organic IR absorbing pigment.

* * * * *